United States Patent
Sansum et al.

(10) Patent No.: US 10,544,873 B2
(45) Date of Patent: Jan. 28, 2020

(54) THERMOSTATIC VALVE

(71) Applicant: Kohler Co., Kohler, WI (US)

(72) Inventors: Nigel P. Sansum, Gloucester (GB); Richard W. Dauncey, Tewkesbury (GB)

(73) Assignee: KOHLER MIRA LIMITED (GB)

( * ) Notice: Subject to any disclaimer, the term of this patent is extended or adjusted under 35 U.S.C. 154(b) by 688 days.

(21) Appl. No.: 13/830,752

(22) Filed: Mar. 14, 2013

(65) Prior Publication Data

US 2014/0261744 A1    Sep. 18, 2014

(51) Int. Cl.
*F16K 31/00* (2006.01)
*G05D 23/13* (2006.01)

(52) U.S. Cl.
CPC ....... *F16K 31/002* (2013.01); *G05D 23/1353* (2013.01); *Y10T 137/0491* (2015.04); *Y10T 137/7737* (2015.04)

(58) Field of Classification Search
CPC ...... F16K 31/002; F16K 25/005; F16K 7/126; G05D 23/1346; G05D 23/1353; G05D 23/132; G05D 23/1306; Y10T 137/7737; Y10T 137/0491
See application file for complete search history.

(56) References Cited

U.S. PATENT DOCUMENTS

| | | | |
|---|---|---|---|
| 5,379,936 A * | 1/1995 | Kline | G05D 23/134 137/625.35 |
| 5,647,531 A * | 7/1997 | Kline et al. | 236/12.14 |
| 7,240,850 B2 | 7/2007 | Beck et al. | |
| 7,669,776 B2 | 3/2010 | Beck et al. | |
| 2004/0000594 A1 * | 1/2004 | Beck et al. | 236/12.15 |
| 2004/0046037 A1 * | 3/2004 | Swadling | G05D 23/1353 236/12.11 |
| 2005/0224031 A1 * | 10/2005 | Knight | F16K 31/025 123/142.5 R |
| 2008/0029156 A1 | 2/2008 | Rosal et al. | |
| 2008/0164330 A1 * | 7/2008 | Wei et al. | 236/12.1 |
| 2010/0270384 A1 | 10/2010 | Sansum et al. | |

FOREIGN PATENT DOCUMENTS

| CN | 101253358 A | 8/2008 |
|---|---|---|
| CN | 01889163 A | 11/2010 |
| CN | 101999104 | 3/2011 |

(Continued)

OTHER PUBLICATIONS

European Search Report for Application No. 14160124.5, dated Jun. 6, 2014, 7 pages.

*Primary Examiner* — Nelson J Nieves
(74) *Attorney, Agent, or Firm* — Foley & Lardner LLP

(57) ABSTRACT

A thermostatic valve is provided. The thermostatic valve includes a first seat, a second seat spaced axially apart from the first seat, and a shuttle. The shuttle is located between the first seat and the second seat, has a first side and a second side axially opposite the first side, and is movable between a first position in which the first side of the shuttle seals against the first seat and a second position in which the second side of the shuttle seals against the second seat. At least one of the first seat, the second seat, and the shuttle includes an overmolded portion for sealing between the shuttle and at least one of the first seat and the second seat.

18 Claims, 18 Drawing Sheets

(56) References Cited

FOREIGN PATENT DOCUMENTS

| | | |
|---|---|---|
| EP | 0 694 721 A1 | 1/1996 |
| GB | 2 291 693 | 1/1996 |
| GB | 2 340 210 | 2/2000 |
| GB | 2 392 223 | 2/2004 |
| GB | 2 392 225 | 2/2004 |
| GB | 2 421 297 | 6/2006 |
| GB | 2 456 271 | 7/2009 |
| WO | WO 2005068799 A1 * | 7/2005 ................ F01P 7/16 |

* cited by examiner

THERMOSTATIC VALVE

BACKGROUND

The present application relates generally to the field of fluid control valves. The present application relates more specifically to the field of thermostatic control valves.

Fluid control valves for plumbing fixtures (e.g., shower control valves) often include a control mechanism to prevent the sudden change in temperature of the water. In the classic example, flushing a toilet may reduce the supply of cold water, thereby causing a sudden increase in temperature of a nearby shower. One version of such control mechanism is a pressure balance unit, which uses a diaphragm or shuttle to balance the pressure between parallel but separate flows of hot and cold water. Another version of such control mechanism is a thermostatic valve, which uses a thermostat to control the flow of hot and cold water.

A typical thermostatic valve has a cold water inlet, a hot water inlet, and a mixed water outlet. The mixed water flows over a thermostat, the expansion and contraction of which causes a shuttle attached to the thermostat to move relative to the hot and cold water inlets, thereby controlling the proportion of hot and cold water flowing through the valve, and thereby regulating the temperature of the outgoing mixed water.

In a typical thermostatic valve, the shuttle needs to seal between the hot and cold water sides, while being able to move freely relative to the hot and cold water inlets. This creates competing interests between low friction and good sealing. Furthermore, as water flows around and through the shuttle, various pressure gradients are set up around the shuttle, thereby making the shuttle susceptible to resonant frequencies, which may result in whistling or other noises that may be annoying to a user. The pressure gradients may further cause seals to become dislodged from the shuttle. Accordingly, shuttles tend to be relatively large, in turn causing relatively large valve cartridges, which, in turn, lead to relatively large valve bodies, all of which increase the cost of the valve. Thus, there is a need for an improved thermostatic valve cartridge.

SUMMARY

One embodiment relates to a thermostatic valve including a first seat, a second seat spaced axially apart from the first seat, and a shuttle. The shuttle is located between the first seat and the second seat, has a first side and a second side axially opposite the first side, and is movable between a first position in which the first side of the shuttle seals against the first seat and a second position in which the second side of the shuttle seals against the second seat. At least one of the first seat, the second seat, and the shuttle comprises an overmolded portion for sealing between the shuttle and at least one of the first seat and the second seat. The first seat, the second seat, and the shuttle may be located in a cartridge. According to an exemplary embodiment, the overmolded portion is formed on the shuttle.

Another embodiment relates to a shuttle for a thermostatic valve having a thermostat. The shuttle includes a hub having a first side and a second side axially opposite the first side and defining a plurality of passages extending axially through the hub. The shuttle further includes a sealing portion overmolded onto the hub.

Another embodiment relates to a method for manufacturing a thermostatic valve. The method includes the steps of providing a hub having a first side and a second side axially opposite the first side, and overmolding a sealing portion onto the hub to form a shuttle.

Another embodiment relates to a thermostatic valve cartridge including a body having a sidewall extending from a first end to a second end, the sidewall defining an axially extending cavity. The thermostatic valve cartridge further includes a first seat located in the cavity proximate the first end, a second seat located in the cavity proximate the second end, and a shuttle. The shuttle is located in the cavity between the first seat and the second seat, has a first side and a second side axially opposite the first side, and is movable between a first position in which the first side of the shuttle seals against the first seat and a second position in which the second side of the shuttle seals against the second seat. At least one of the first seat, the second seat, and the shuttle comprises an overmolded portion for sealing between the shuttle and at least one of the first seat and the second seat. According to an exemplary embodiment, the overmolded portion is formed on the shuttle.

The foregoing is a summary and thus, by necessity, contains simplifications, generalizations, and omissions of detail. Consequently, those skilled in the art will appreciate that the summary is illustrative only and is not intended to be in any way limiting. Other aspects, inventive features, and advantages of the devices and/or processes described herein, as defined solely by the claims, will become apparent in the detailed description set forth herein and taken in conjunction with the accompanying drawings.

DETAILED DESCRIPTION

Figure 1:
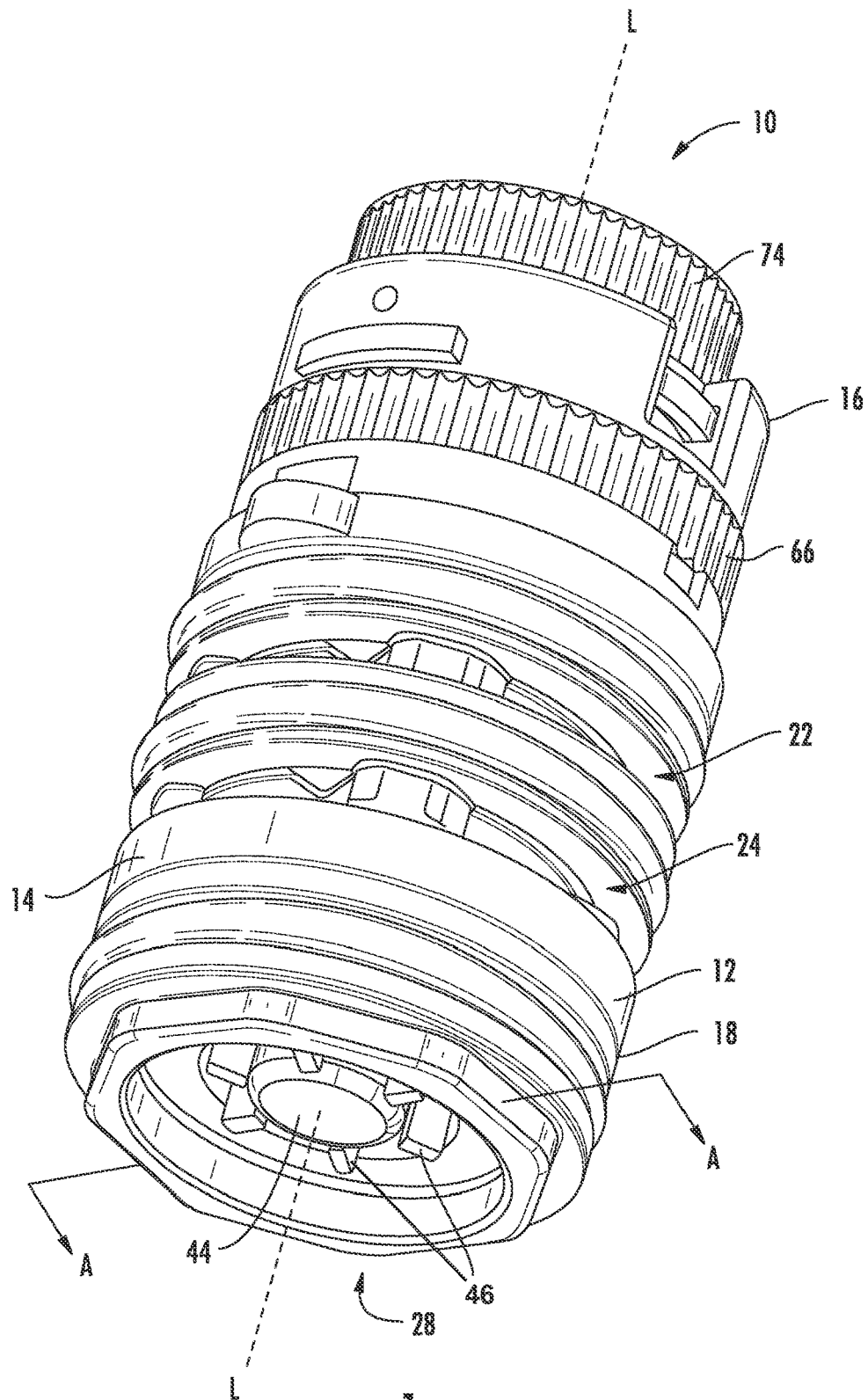
FIG. 1 is a bottom perspective view of a thermostatic valve cartridge, shown according to an exemplary embodiment.
Figure 2:
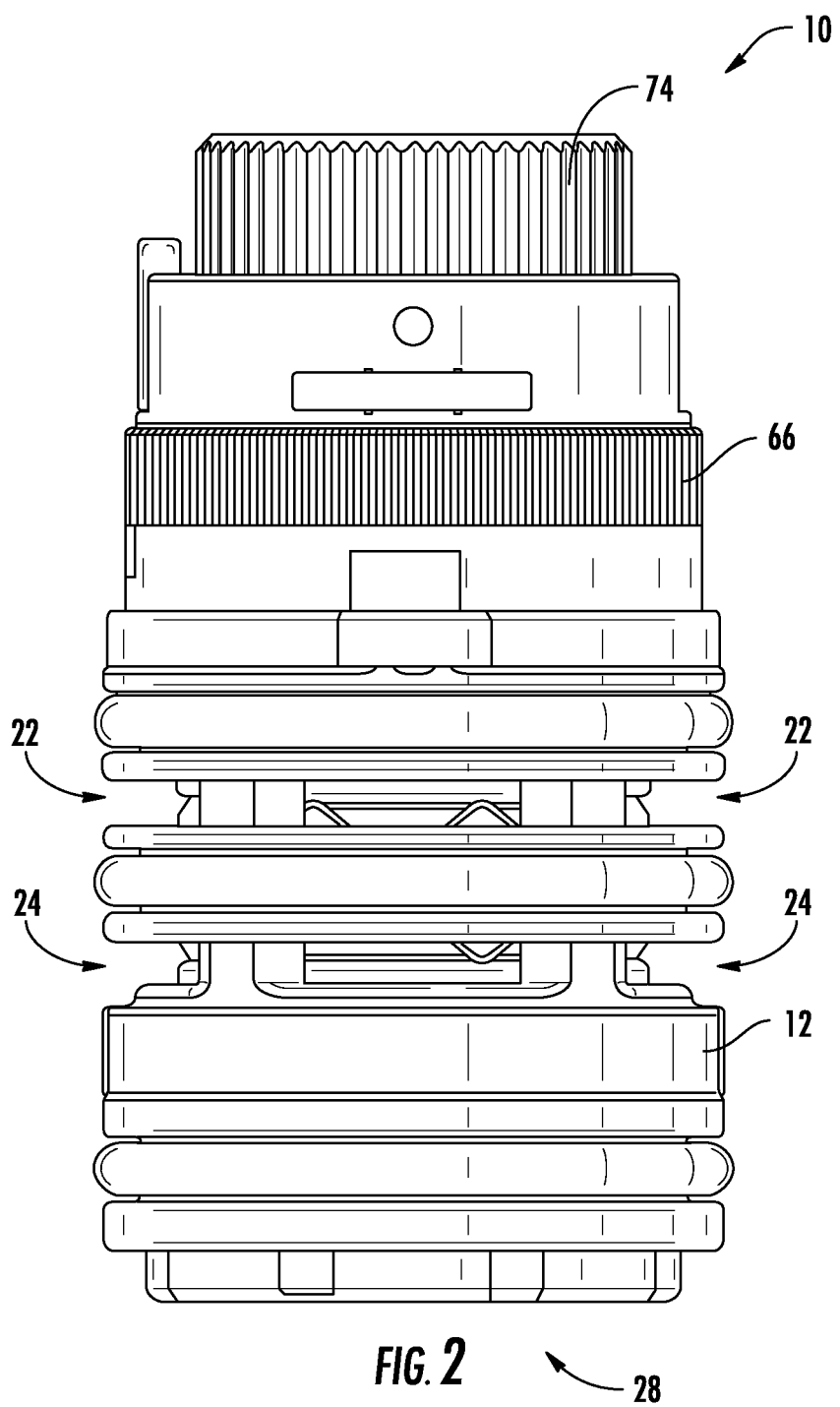
FIG. 2 is a front elevation view of the cartridge of FIG. 1, shown according to an exemplary embodiment.
Figure 3:
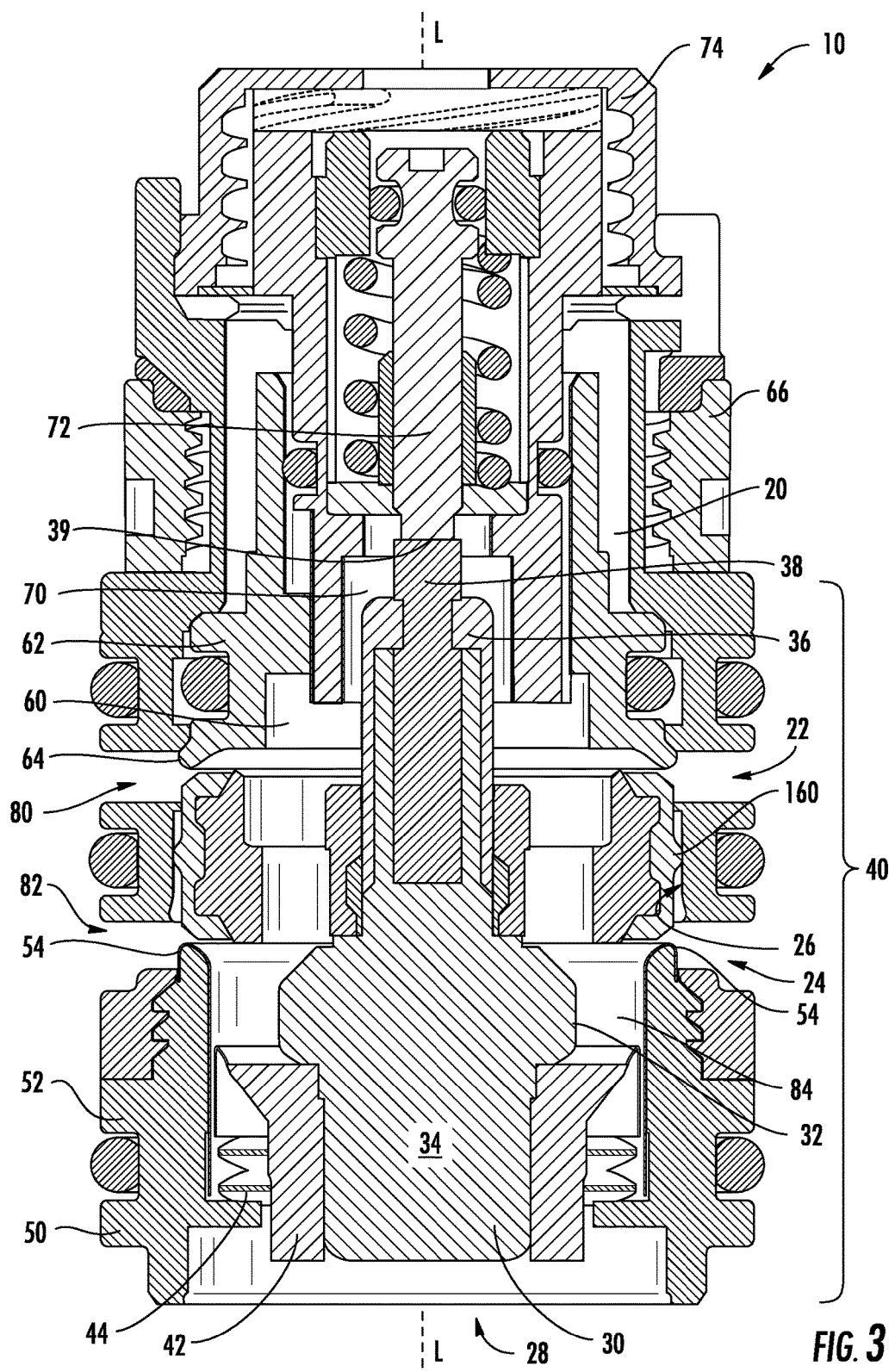
FIG. 3 is a front elevation section through line A-A of FIG. 1, shown according to an exemplary embodiment.

Referring to FIGS. 1-3, a thermostatic valve cartridge 10 and components thereof are shown according to an exemplary embodiment. The cartridge 10 includes a body 12 having a sidewall 14 extending from a first or top end 16 to a second or bottom end 18. The sidewall 14 substantially defines a cavity 20. According the exemplary embodiment shown, the body 12, sidewall 14, and cavity 20 extend longitudinally or axially along an axis L.

The cartridge body 12 defines a first inlet port (e.g., opening, aperture, hole, etc.), shown as cold inlet port 22, that extends through the sidewall 14 from an exterior of the cartridge 10 to the cavity 20. The cartridge body 12 further defines a second inlet port (e.g., opening, aperture, hole, etc.), shown as hot inlet port 24, that extends through the sidewall 14 from an exterior of the cartridge 10 to the cavity 20. The hot inlet port 24 is axially spaced apart from the cold inlet port 22, and portions of the cold and hot inlet ports 22, 24 are shown to extend circumferentially at least partially around the cartridge 10. The cartridge 10 further includes an outlet 28, which may be defined, for example, by the cartridge body 12 or an end plug 50 coupled to the cartridge body 12.

The cartridge 10 includes a thermostat 30, shown according to an exemplary embodiment, having a housing 32 defining a reservoir 34 and having a tube 36 (e.g., stem, cylinder, etc.) extending axially from the housing 32. A piston 38 (e.g., pin, plunger, etc.) is located at least partially in the tube 36 and extends axially from the tube 36 away from the reservoir 34. A temperature responsive material (e.g., wax; not shown) is located in the reservoir 34 and operatively coupled to the piston 38 to cause the piston 38 to at least partially extend (e.g., advance, push out, etc.) from the tube 36 and to retract (e.g., recede, pullback, etc.) into the tube 36 in response to the thermal expansion and thermal contraction of the wax and extension of the return spring 44.

Further referring to FIGS. 5-11, the cartridge 10 includes a shuttle 100, shown according to an exemplary embodiment, having a first side, shown as cold side 102, and a second side, shown as hot side 104, that is axially opposite that cold side 102. The shuttle 100 includes a hub 110 having a first side, shown as cold side 112, and a second side, shown as hot side 114, that is axially opposite that cold side 112. The hub 110 includes an outer sidewall 116 and a central collar 118 that at least partially defines a bore 120 extending along an axis L'. Referring briefly to the exemplary embodiment shown in FIG. 3, the axes L and L' may be coaxial. At least one (e.g., one, two, a plurality, etc.) of passages 122 (e.g., passageways, etc.) extend axially through the hub 110 from the cold side 112 to the hot side 114. In operation, the passages permit the flow of water from the cold side 102 to the hot side 104 of the shuttle 100. On the cold side 112 of the hub 110, the sidewall 116 and the collar 118 at least partially define a chamber (e.g., cavity, pocket, recess, etc.) shown as cold chamber 124.

The shuttle 100 is further shown to include an overmolded portion 130 that is overmolded (e.g., co-molded, insert-molded, etc.) onto the hub 110. The overmolded portion 130 includes a first end portion (e.g., top end, end portion, etc.), shown as cold end portion 132, and a second end portion (e.g., bottom end, and portion, etc.), shown as hot end portion 134. The overmolded portion 130 is further shown to include a sidewall portion 136 extending at least partially between the cold side 112 and the hot side 114 of the hub 110. According to the exemplary embodiment shown, the sidewall portion 136 and the cold end portion 132 are joined by an eased edge 138 (e.g., bevel, taper, radius, round, etc.). According to the exemplary embodiment shown, the sidewall portion 136 and the hot end portion 134 are joined by an eased edge 139. According to the exemplary embodiment shown, the eased edge is 138, 139 are chamfered edges. The cold end portion 132, the hot end portion 134, the eased edges 138, 139, or any combination thereof, may be or form one or more sealing surfaces The overmolded portion 130 is further shown to include at least one (e.g., one, two, a plurality, etc.) rib 150 shown to extend axially from the cold end portion 132 and the hot end portion 134. The overmolded portion 130 is further shown to include a separator seal 160 extending radially outward from the sidewall portion 136 and the hub 110. As shown, the separator seal 160 extends circumferentially around the hub 110. According to the exemplary embodiment shown, the hub 110 is formed of a first material, and the overmolded portion 130 is formed of a second material different than the first material. A primer or adhesive may be applied to the hub 110 (e.g., to activate the surface) before overmolding the overmolded portion 130 onto the hub 110. According to other embodiments, the hub 110 and the portion 130 may be formed separately and coupled together, for example, using an adhesive.

According to various exemplary embodiments, the overmolded portion 130 may or may not include the eased edges 138, 139, ribs 150, separator seal 160, or any combination thereof. According to various exemplary embodiments, the eased edges 138, 139, ribs 150, separator seal 160, or any combination thereof, may be components of a single overmolded portion or may be components of multiple overmolded portions. According to the exemplary embodiment shown, the cold end portion 132, the hot end portion 134, the sidewall portion 136, the eased edges 138, 139, ribs 150, and the separator seal 160 are all formed of a single overmolded portion 130, thereby reducing cost and complexity of the shuttle 100 versus a typical shuttle that may have a hub and multiple seals and o-rings. Features and advantages of the shuttle 100 and components thereof will be described in more detail below.

Returning to FIGS. 1-3, the shuttle 100 is coupled to the thermostat 30 to form, at least in part (i.e., to be at least some of the components of), a thermostat-shuttle assembly 40. According to the embodiment shown, the shuttle 100 is coupled to the tube 36 of the thermostat 30. According to one embodiment, the tube 36 includes external threads that threadably couple to threads around the bore 120 in the hub 110 of the shuttle 100. According to another embodiment, the hub 110 is press fit onto the tube 36. According to a preferred embodiment, the shuttle 100 is fixed to the thermostat 30 such that the shuttle 100 moves along with the tube 36 in response to thermal expansion and contraction of wax in the reservoir 34. The thermostat-shuttle assembly 40 is positioned in the cartridge 10 such that the shuttle 100 seals between the cold inlet port 22 and the hot inlet port 24. For example, the cartridge 10 may include an inner surface 26 that at least partially defines the cavity 20, and the separator seal 160 of the shuttle 100 seals against the entire circumference of the inner surface 26 to prevent hot or cold water from flowing around the outside of the shuttle 100.

The thermostat-shuttle assembly 40 is further shown to include a flow guide 42 and a resilient member, shown as return spring 44. The flow guide 42 is shown to couple to and to support the thermostat housing 32 axially opposite the tube 36. The flow guide 42 may include a plurality of fins 46 configured to help laminarize (i.e., reduce the turbulence of) the fluid as it flows out of the cartridge 10 through outlet 28. The flow guide 42 is supported by the return spring 44, which, in turn, is supported by an end plug 50 that is coupled to the cartridge body 12, thereby retaining the thermostat-shuttle assembly 40 in the cavity 20. The return spring 44 may be any suitable type of spring, for example, a coil or helical spring such as the spring 244 shown in FIG. 12 or the spring 344 shown in FIG. 13, a cone-disc spring (Belleville washer), a cantilever spring, etc. According to the exemplary embodiment shown, the return spring 44 is a wave spring. A wave spring generally allows for reduced operating heights and provides a more even distribution of forces, which may increase the tendency to align and to reduce radial or lateral loading or binding of the shuttle 100 against the inner surface 26 of the cartridge body 12.

The end plug 50 includes a body 52 that couples to the cartridge body 12 proximate the bottom end 18. According to various embodiments, any suitable method of coupling may be employed (e.g., bayonet, adhesive, press fit, welding, etc). As shown, the body 52 threadably couples to the cartridge body 12. The end plug 50 is further shown to include a hot seat 54 proximate the hot inlet port 24 and against which the hot side 104 of the shuttle 100 may seal. According to the embodiment shown, the hot seat 54 may be formed as a portion of the body 52, for example, a relatively hard surface against which the relatively softer overmolded portion 130 of the shuttle 100 seals. According to another embodiment, the hot seat 54 may be a relatively soft ring seal that is mechanically joined to (e.g., pressed into, trapped into) an axial end of the body 52. According to another embodiment, the hot seat 54 may be a relatively soft sealing surface that is overmolded onto the body 52. According to various other embodiments, the hot seat 54 may be coupled to an intermediary member in the cartridge 10 and not to the end plug 50. See, for example, FIGS. 12-14, some or all of the components and/or features of which may be used with some or all of the components and/or features shown and described with respect to the cartridge 10.

The cartridge 10 further includes a flow controller 60 having a body 62, shown according to an exemplary embodiment. As shown, the flow controller body 62 is slidably coupled to the cartridge body 12 between the top end 16 and the cold inlet port 22. The flow controller 60 is further shown to include a cold seat 64 proximate the cold inlet port 22 and against which the cold side 102 of the shuttle 100 may seal. According to the embodiment shown, the cold seat 64 may be formed as a portion of the body 62, for example, a relatively hard surface against which the relatively softer overmolded portion 130 of the shuttle 100 seals. According to another embodiment, the cold seat 64 may be a relatively soft ring seal that is mechanically joined to the body 62. According to another embodiment, the cold seat 64 may be a relatively soft sealing surface that is overmolded onto the body 62.

The cartridge 10 further includes a temperature follower 70, shown according to an exemplary embodiment. The temperature follower 70 is shown to extend axially through the flow controller 60 and to include an overload assembly 72 (e.g., maximum temperature screw, overload spring, overload spring retainer, etc.) that abuts a distal end 39 of the piston 38 of the thermostat 30. A temperature actuator (e.g., knob, handle, adapter, etc.) is operably coupled to the temperature follower 70 axially opposite the end that abuts the piston 38. A flow actuator 66 (e.g., knob, handle, adapter, etc.) is operably coupled to the flow controller 60. According to various embodiments, the cartridge 10 may not include a flow controller 60 and/or a flow actuator 66. For example, if the plumbing fixture has separate temperature control and volume control valves, the cold seat 64 may be fixed to the cartridge body 12. For example, if the valve is a sequential valve, the temperature actuator 74 may be configured to control both the temperature follower 70 and the flow controller 60.

Figure 4:
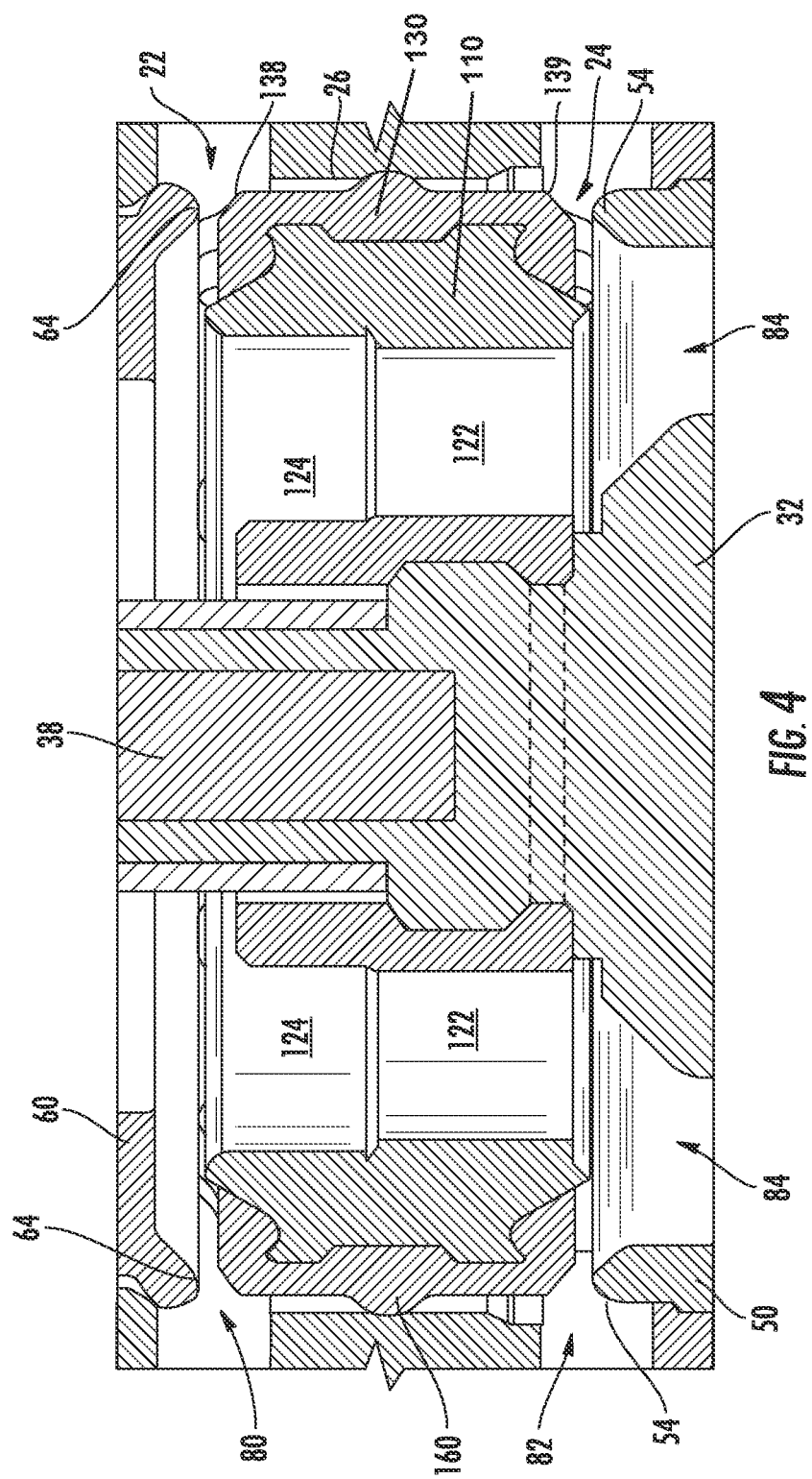
FIG. 4 is an enlarged portion of the front elevation view of FIG. 3, shown according to an exemplary embodiment.
Figure 16:
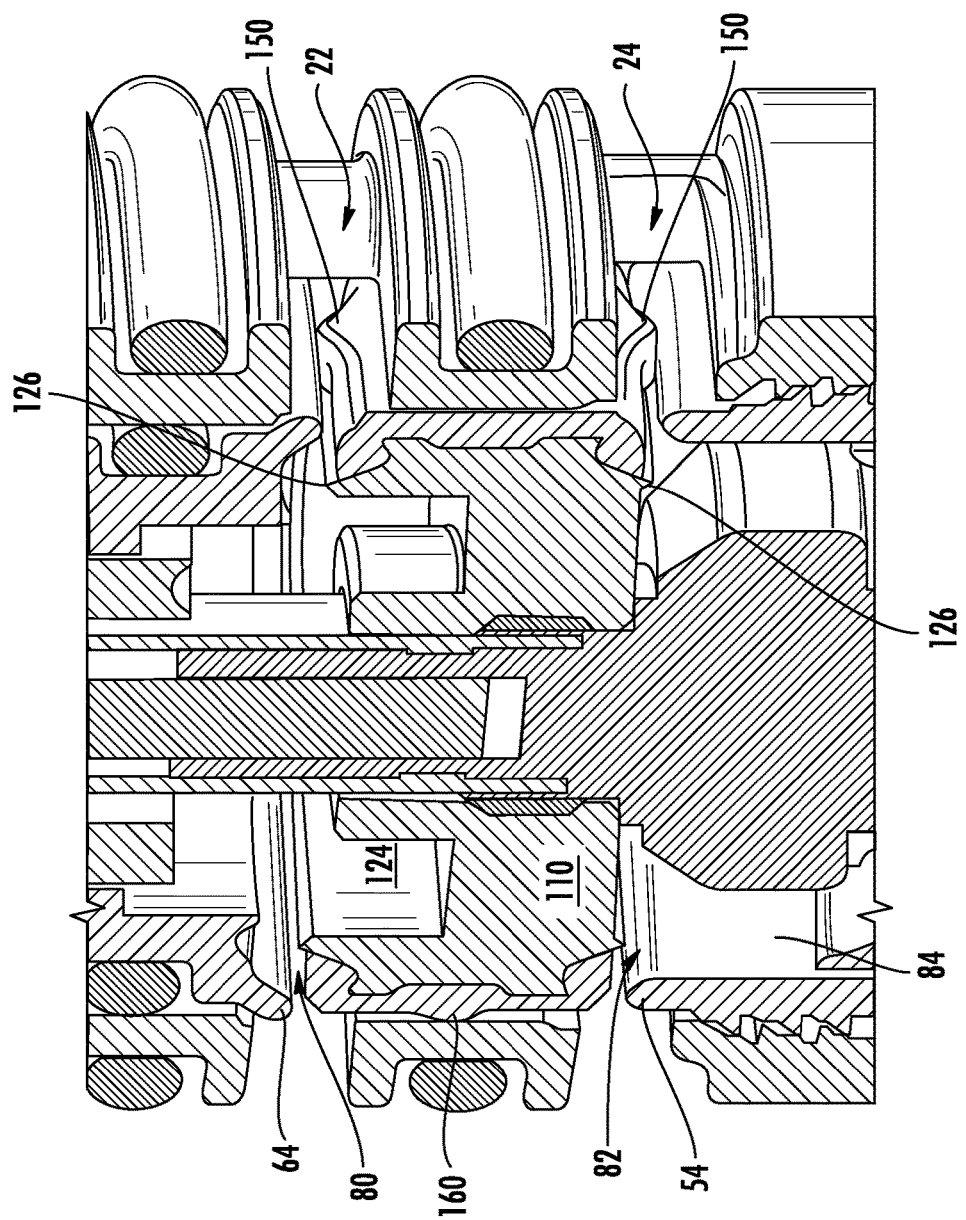
FIG. 16 is a top perspective section view of the cartridge of FIG. 1, shown according to an exemplary embodiment.

Further referring to FIGS. 4 and 16, an exemplary embodiment of operation is now described. Cold water enters the cold inlet port 22, flows through a gap 80 between the shuttle 100 and the cold seat 64, and flows into the cold chamber 124 of the hub 110 of the shuttle 100. Hot water enters the hot inlet port 24 and flows through a gap 82 between the shuttle 100 and the hot seat 54. Cold water flows through passageways 122 in the hub 110 to mix with the hot water in a mixing chamber 84, proximate the thermostat housing 32. The mixed water then flows around the thermostat housing 32 and through an outlet 28 of the cartridge 10. Manipulation of the temperature actuator 74 causes the temperature follower 70 to push against the piston 38 of the thermostat 30. Accordingly, the thermostat-shuttle assembly 40 may be moved axially to select desired relative proportions of the gaps 80, 82 between the shuttle 100 and the cold seat 64 and the shuttle 100 and the hot seat 54, thereby selecting a desired proportion of hot and cold water flows, thereby selecting a desired temperature of the mixed water exiting the cartridge 10.

As the mixed water temperature cools (e.g., a reduction in hot water supply, a cooling of the hot water supply, etc.), the wax in the thermostat reservoir 34 contracts causing the piston 38 to retract. In response to this reduced force between distal end 39 of the piston 38 and the temperature follower 70, the return spring 44 causes the thermostat-shuttle assembly 40 to move towards the temperature follower 70. Accordingly, the gap 80 between the shuttle 100 and the cold seat 64 is reduced, and the gap 82 between the shuttle 100 and the hot seat 54 is increased, thereby increasing the proportion of hot water that mixes with cold water in the cartridge 10. If instead, for example, the mixed water temperature warms (e.g., a reduction in cold water supply, etc.), the wax in the thermostat reservoir 34 expands, causing the piston 38 to extend from the thermostat 30. In response to an increased force between the piston 38 and the temperature follower 70, the thermostat-shuttle assembly 40 moves away from the temperature follower 70, compressing the return spring 44. Accordingly, the gap 82 between the shuttle 100 and the cold seat 64 is increased, and the gap 80 between the shuttle 100 and the hot seat 54 is reduced, thereby increasing the proportion of cold water that mixes with the hot water in the cartridge. The system equilibrium maintains the desired mixed water temperature so long as there is sufficient hot and cold water supplied to thermodynamically achieve that temperature.

In an embodiment with a movable flow controller 60, the flow controller 60 may be moved axially (e.g., in response to manipulation of the flow actuator 66, in response to manipulation of the temperature actuator 74, etc.) such that the cold seat 64 moves towards the hot seat 54. Accordingly, the distance between the cold seat 64 and the hot seat 54 is reduced. The thermostat 30 compensates for these changes in gap 80, 82 sizes such that movement of the cold seat 64 towards the hot seat 54 causes a reduction in both the gap 80 between the shuttle 100 and the cold seat 64 and between the shuttle 100 and the hot seat 54, thereby resulting in overall reduction in flow volume through the cartridge 10. Further movement of the flow controller 60 towards the hot seat 54 causes the cold seat 64 to push the shuttle 100 against the hot seat 54, thereby closing both the hot gap 82 and the cold gap 80, which results in a stoppage of flow (e.g., closing of the valve, turning off of the valve, etc.). In contrast, moving the flow controller 60 away from the hot seat 54 increases both the hot gap 82 and the cold gap 80, thereby increasing the flow volume through the cartridge 10.

Figure 5:
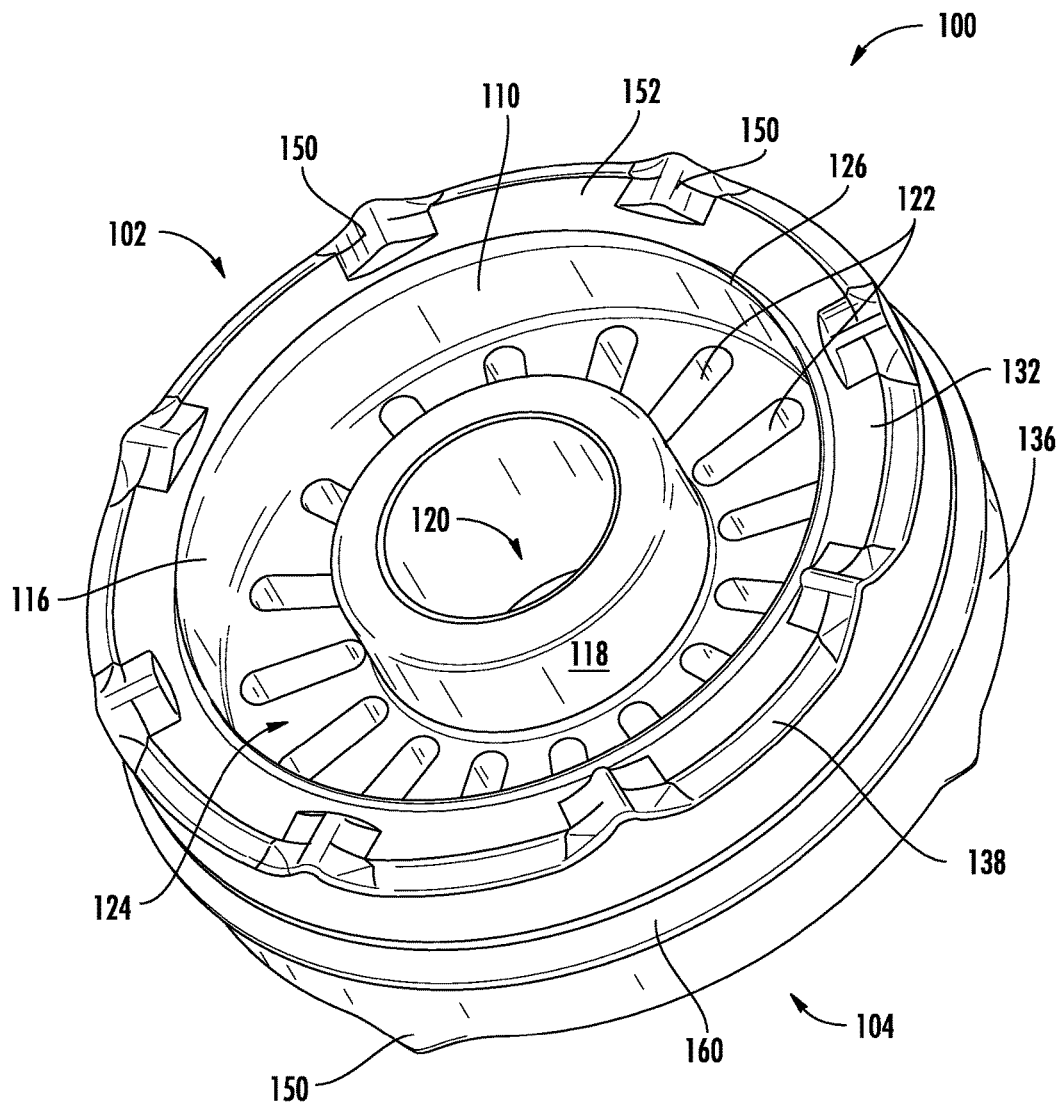
FIG. 5 is a top perspective view of a shuttle for a thermostatic valve cartridge that may be used with the cartridge of FIG. 1, shown according to an exemplary embodiment.
Figure 6:
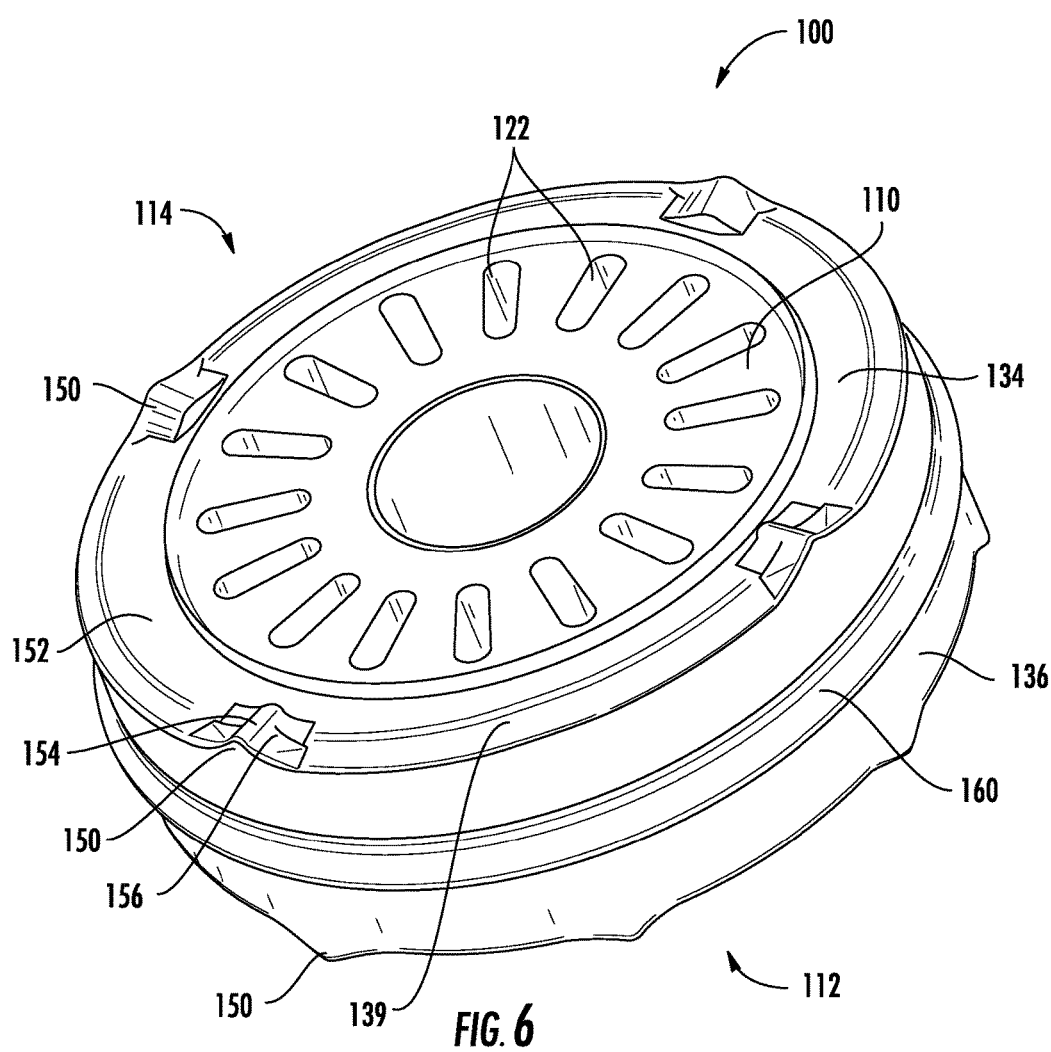
FIG. 6 is a bottom perspective view of the shuttle of FIG. 5, shown according to an exemplary embodiment.
Figure 7:
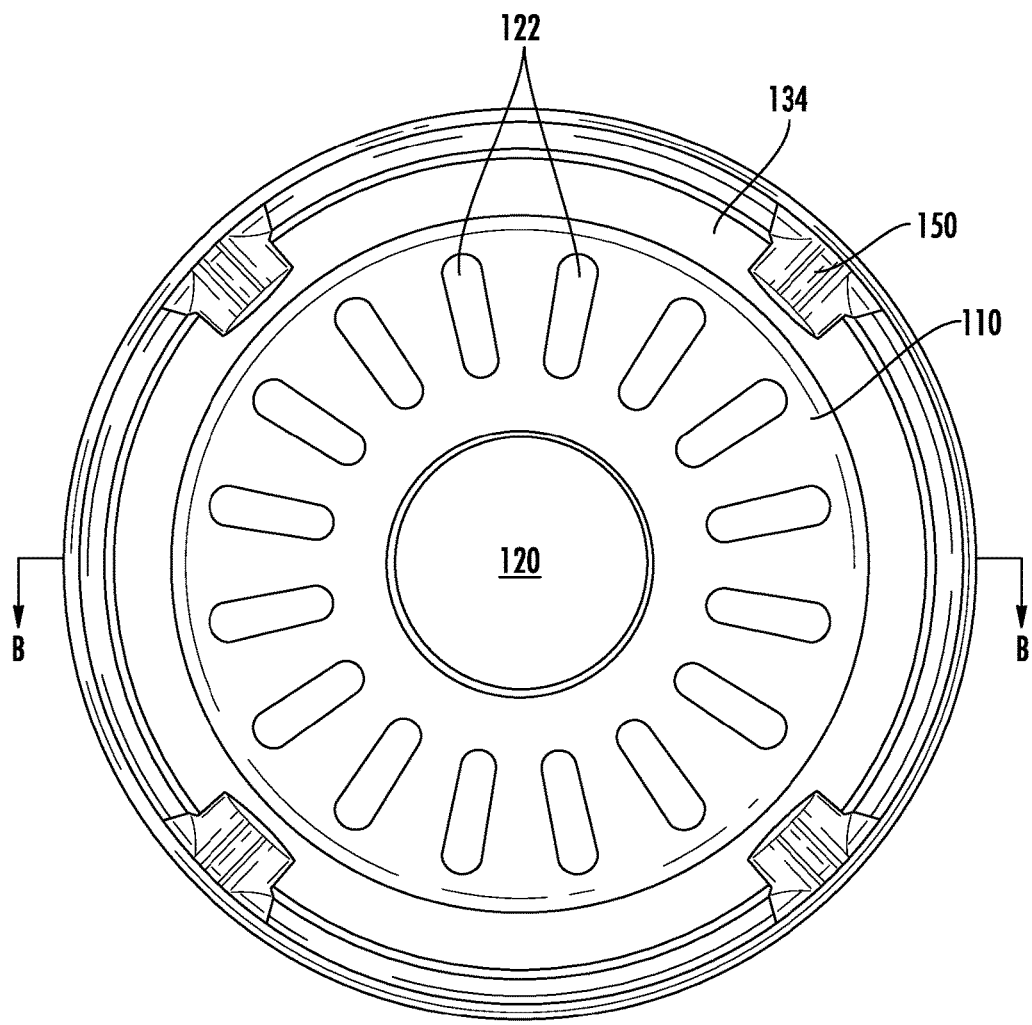
FIG. 7 is a bottom plan view of the shuttle of FIG. 5, shown according to an exemplary embodiment.
Figure 8:
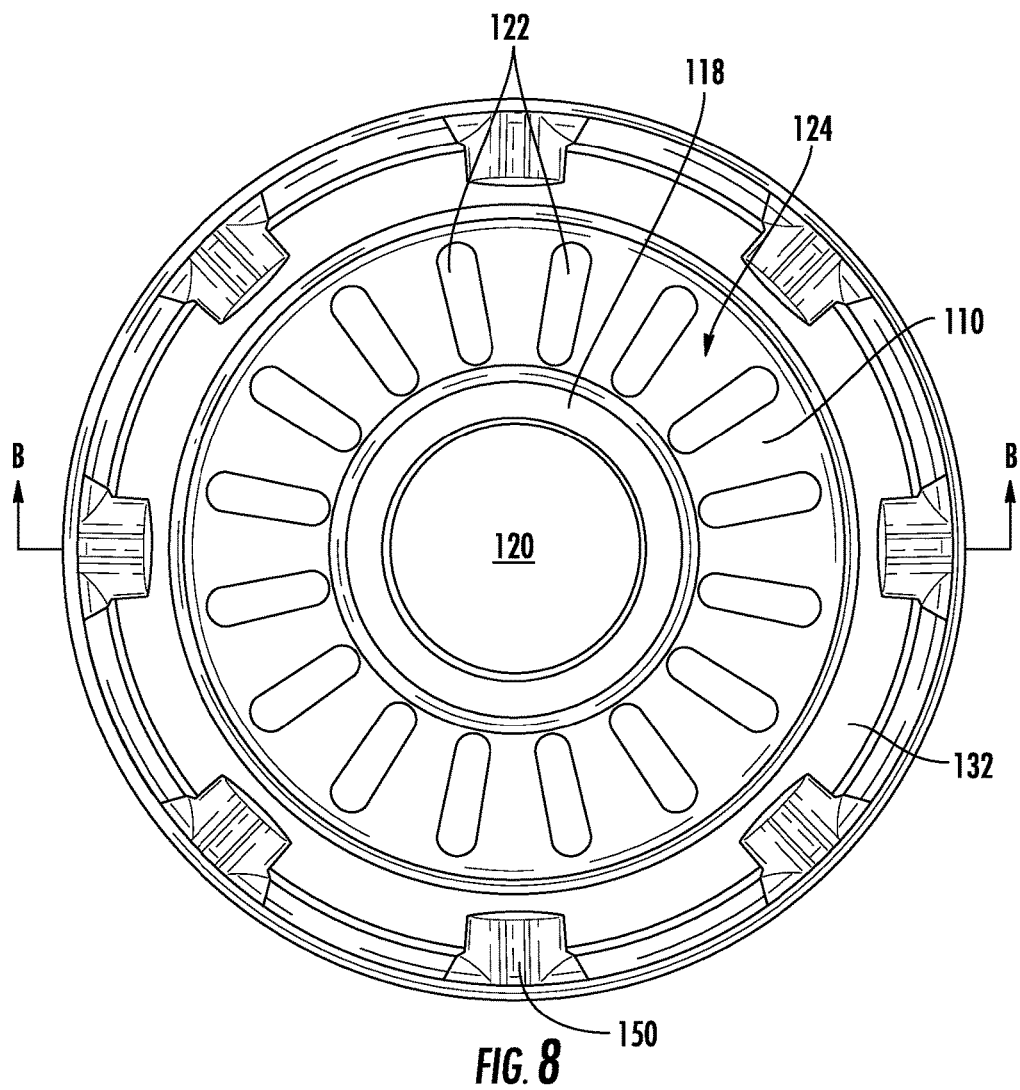
FIG. 8 is a top plan view of the shuttle of FIG. 5, shown according to an exemplary embodiment.
Figure 9:
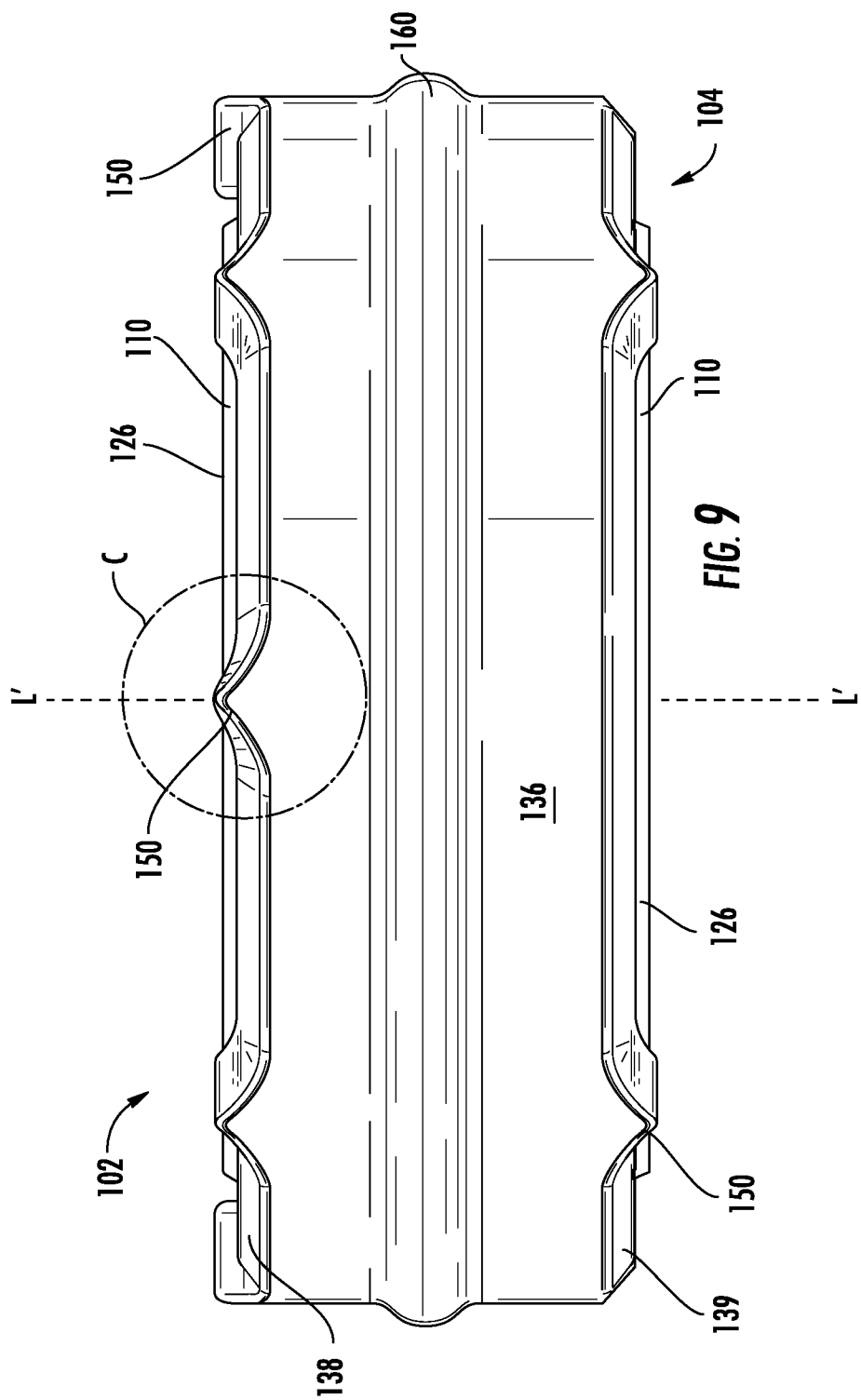
FIG. 9 is a front elevation view of the shuttle of FIG. 5, shown according to an exemplary embodiment.
Figure 10:
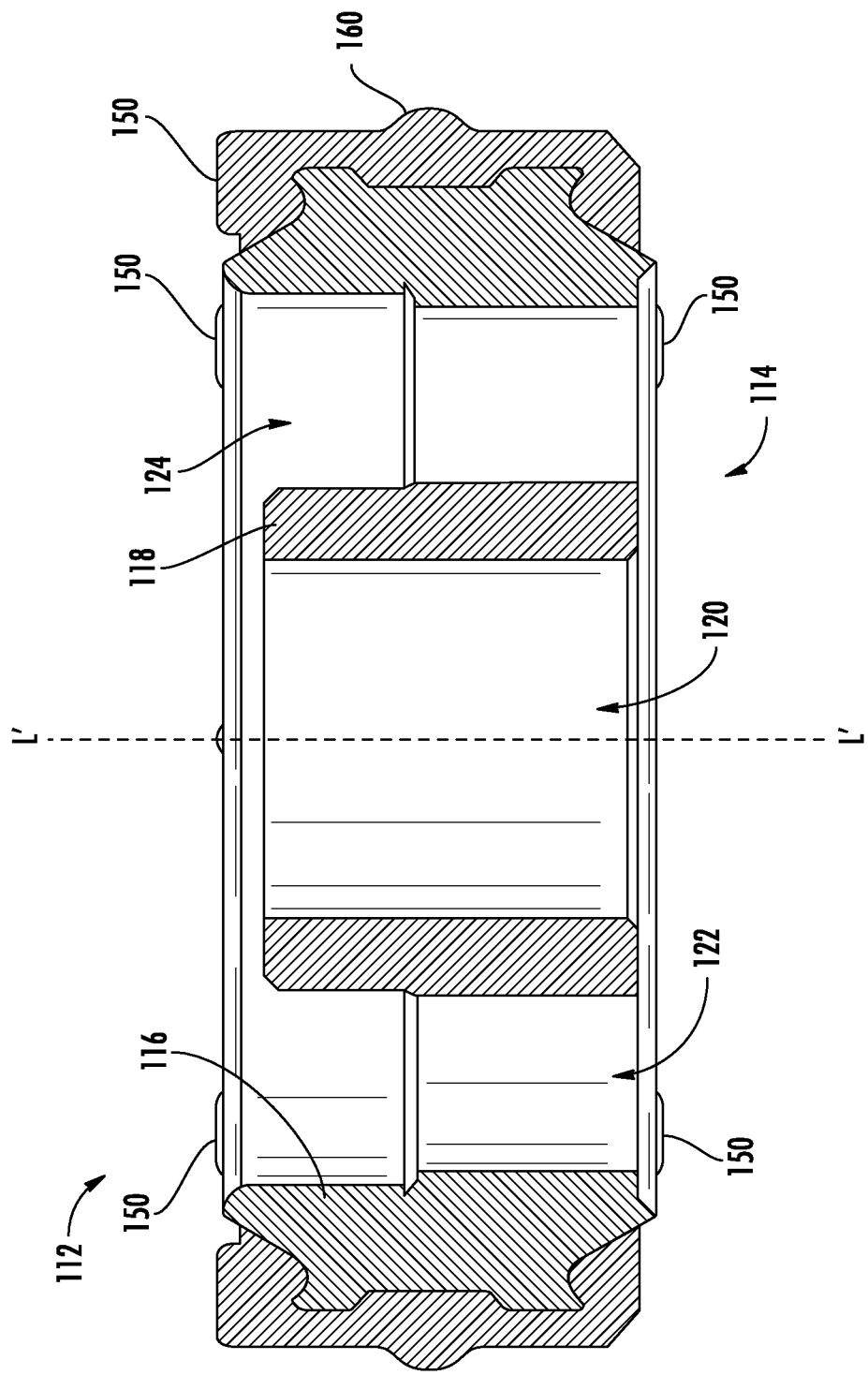
FIG. 10 is a front elevation section through lines B-B of FIGS. 7-8, shown according to an exemplary embodiment.
Figure 11:
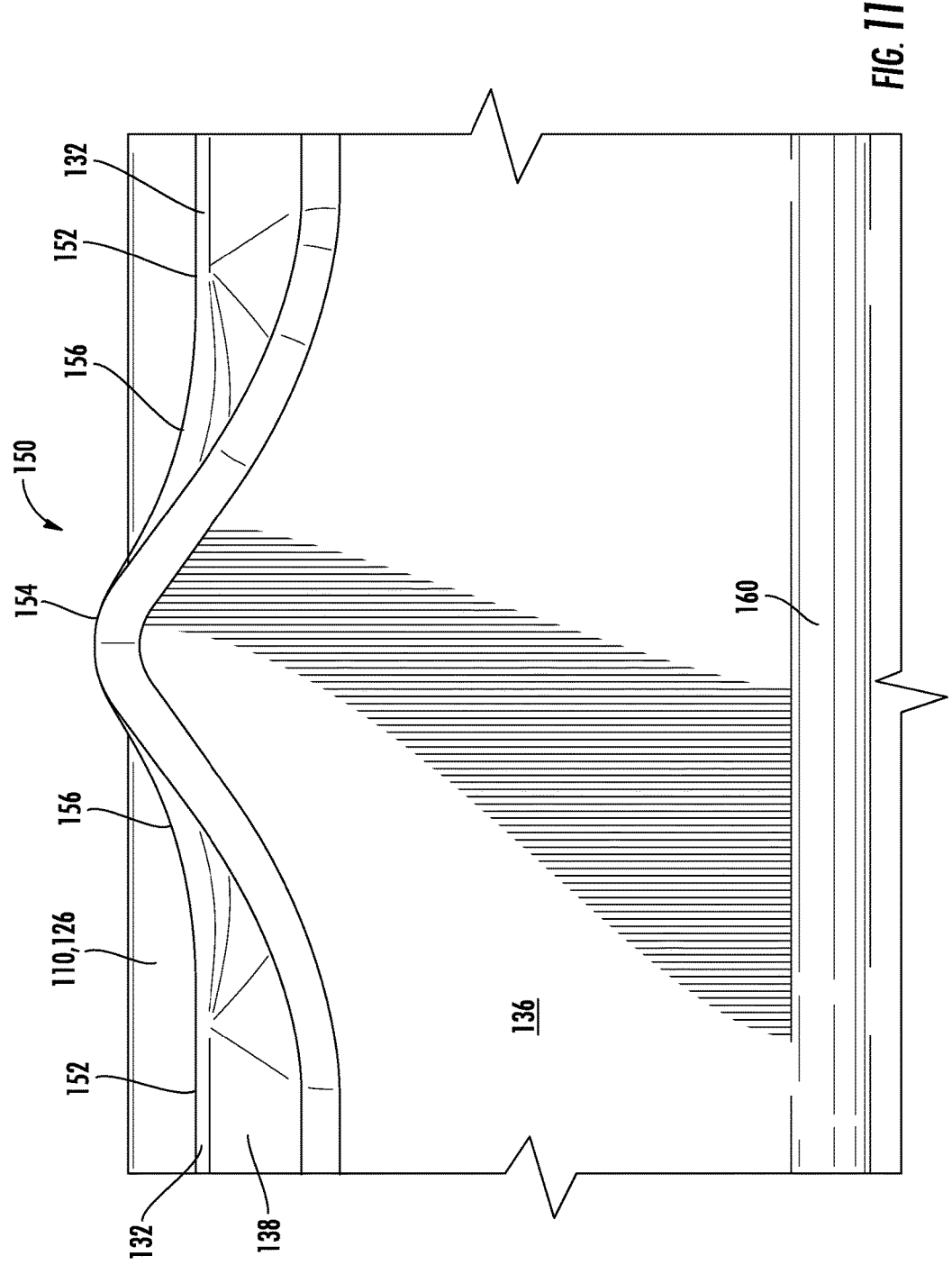
FIG. 11 is an enlarged front elevation view of the portion C of FIG. 9, shown according to an exemplary embodiment.

Referring to FIGS. 4-10, a shuttle 100 and components thereof are shown according to an exemplary embodiment. The shuttle includes a hub 110 and an overmolded portion 130. The overmolded portion 130 is shown to include a plurality of ribs 150 extending axially from the cold side 102 and the hot side 104 of the shuttle 100. Referring specifically to FIGS. 5 and 11, the ribs 150 are shown to be spaced circumferentially apart with substantially flat regions 152 between the ribs 150. The ribs 150 each have a peak 154 and a transition zone 156 between the peak 154 and the flat regions 152. The transition zones 156 and the peak 154 may have any suitable linear, curved, or curvilinear shape. The transition zones 156 are shown to be symmetric about the peak 154, but may not be in other embodiments. According to other embodiments, the peak-to-peak geometry may be continuously curved.

Figure 17:
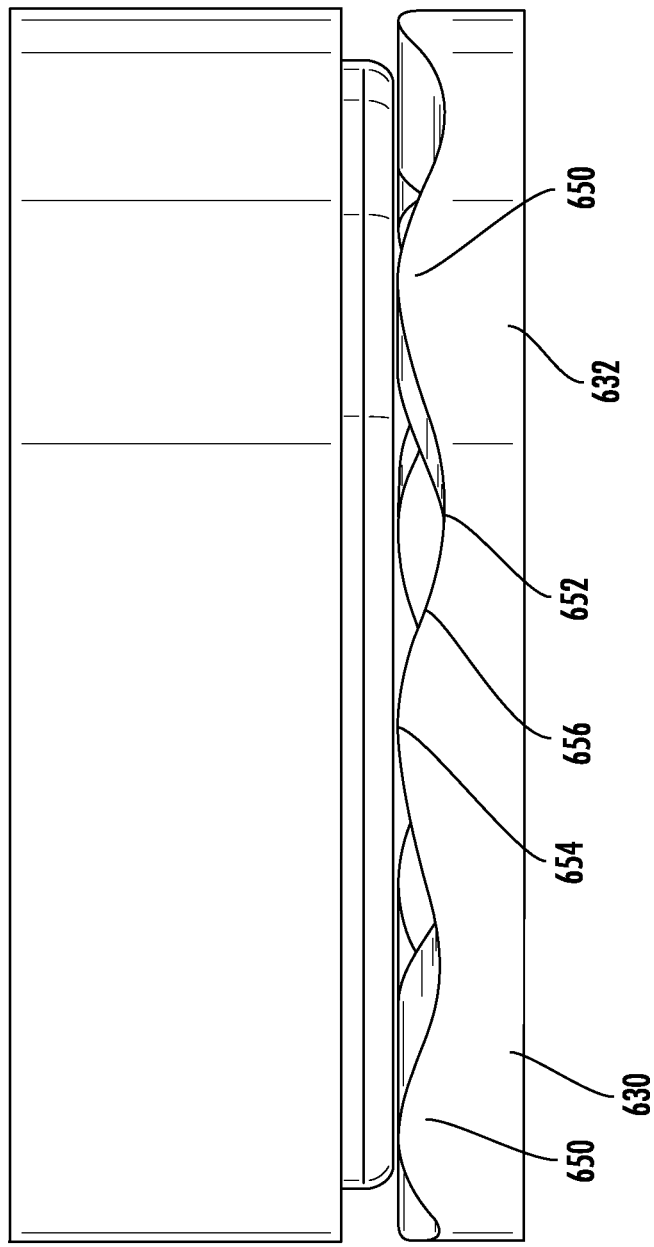
FIG. 17 is a top perspective section view of a portion of a shuttle showing a pattern of ribs, according to another exemplary embodiment.

Further referring to FIG. 17, the plurality of ribs 650 forms a wave shape or a substantially sinusoidal shape extending circumferentially along the end portion 632. The ribs 650 are shown to include transition zones 656 that extend between a maximum or peak 654 and a minimum or trough 652. As shown, the surface of the overmolded portion 630 oscillates between maxima and minima.

Figure 18:
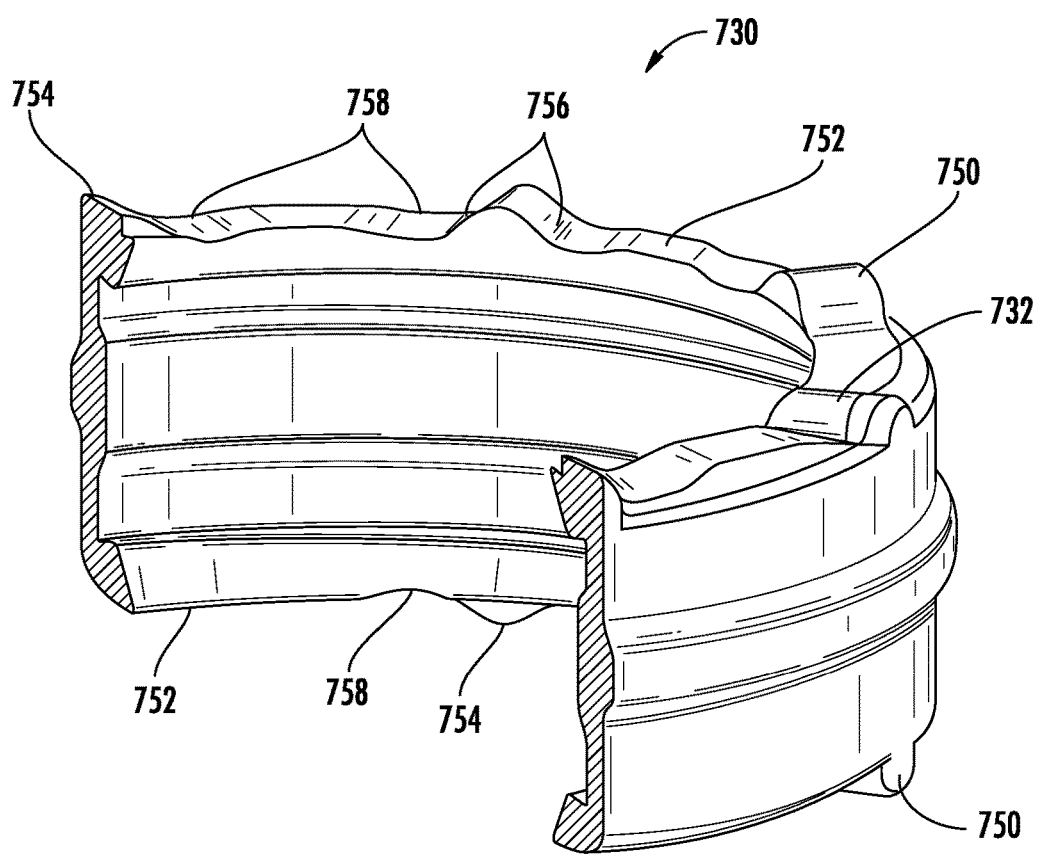
FIG. 18 is a top perspective section view of a portion of a shuttle showing a pattern of ribs, according to another exemplary embodiment.

Further referring to FIG. 18, the ribs 750 of the overmolded portion 730 are organized into more complex shapes or patterns. The end portion 732 is shown to include transition zones 756 extending between peaks 754 and flat regions 752. As shown, the transition zones 756 define valleys 758 (e.g., recesses, depressions, troughs, subsurface formations, etc.) that are axially below a plane substantially defined by the flat regions 752. Valleys 758 may compensate for or regain the flow area through the gaps 80, 82 that is lost or obstructed by ribs 150, 750, thereby allowing greater water flow through the gaps 80, 82. It may be advantageous to have the valleys on only one of the hot side and the cold side, for example, as will be discussed below, there are a different number of ribs on the hot side of the shuttle and the cold side of the shuttle. Valleys 758 may provide volume for the ribs 750 to spread into when the ribs 750 are compressed, for example, against a hot seat or cold seat. The geometry of the transition zones 756 may be configured such that as the rib 750 is compressed downward, the valley 758 is lifted upward. That is downward force on the rib 750 displaces the material proximate the rib 750 laterally or circumferentially into a space beneath the valley 758, thereby causing the valley 758 to lift up. Causing the valley 758 to lift up creates an axial force against the opposing sealing surfaces (e.g., hot seat, cold seat, etc.) and may, therefore, create a better seal therebetween.

The ribs 150, 650, 750 are preferably formed of a resilient material such that when the shuttle is pressed against the cold seat 64 or the hot seat 54 (e.g., a first position, a full cold position, a second position, a full hot position, etc.), the ribs 150, 650, 750 may be compressed to form a substantially flat sealing surface. According to an exemplary embodiment, the ribs 150, 650, 750 may be compressed to form a coplanar sealing surface with the flat regions 152, 652, 752. According to an embodiment with a wave pattern of ribs 650, the peaks 654 and transition zones 656 may be compressed to form a substantially planar sealing surface with the troughs 652. According to an embodiment with valleys 758, whether the ribs 750 spread into the valley 758 or cause the valley 758 to lift up, the peaks 754 and transition zones 756 may be compressed to form a substantially planar sealing surface with the flat regions 752.

Returning to the embodiment shown in FIGS. 4-10, the transitions zones 156 have a relatively large radius of curvature relative to the height of the rib 150 from the flat region 152 of the end portion 132. As shown, the radius of curvature of the transition zone 156 is approximately four to six times the height of the rib 150. According to other embodiments, the radius of curvature of the transition zone 156 may be between approximately one and ten times the height of the rib 150. According to other embodiments, the radius of curvature of the transition zone 156 may be between approximately three and five times the height of the rib 150. According to other embodiments, the radius of curvature of the transition zone 156 may be between approximately five and seven times the height of the rib 150. According to other embodiments, the radius of curvature of the transition zone 156 may be a function of the hardness or durometer of the material from which the overmolded portion 130 is formed. Having a relatively large radius of curvature permits the material of the peaks 154 and transition zones 156 to be compressed into a smooth sealing surface coplanar with the flat regions 152. A relatively small radius of curvature may cause the compressed material to "stack up", i.e., not compressing into a smooth sealing surface, thereby forming discontinuities and leakpaths.

The applicants discovered that in a typical thermostatic valve, for example, when the shuttle 100 is close to, but not seated against, the cold seat 64 (or hot seat 54), the flow of water through the narrowed gap 80 (or gap 82) may have a low pressure resulting from the Bernoulli principle. Accordingly, the low pressure draws the shuttle 100 toward the cold seat 64, which reduces flow enough to reduce the low pressure zone, thereby allowing the shuttle to pull away from the cold seat 64, but allowing increased flow and allowing the low pressure zone to reform. This cyclical effect can generate a resonance in the shuttle or other components of the valve, in turn generating a noise (e.g., whistle, hum, buzz, etc.) that may be annoying to a user.

With this in mind, the overmolded portion 130 is preferably formed of a material (e.g., rubber, elastomer, polymer, etc.) that is both resilient and resists compression set. Accordingly, when the ribs 150 are compressed against the cold seat 64 or the hot seat 54, the ribs 150 provide a force pushing the shuttle 100 away from the proximate seat 54, 64 towards the other seat. This is advantageous because the resilience (e.g., elasticity, spring rate, springiness, etc.) of the ribs 150 dampens the resonance or vibration of the shuttle 100, thereby inhibiting the aforementioned noise. Further, the resilience of the ribs 150 overcomes (e.g., mitigates, compensates for, etc.) the effect of the forces caused by the Bernoulli effect, thereby allowing the shuttle to move more freely in response to pressure and/or temperature variations. Further, the resilience of the ribs 150 overcomes (e.g., mitigates, compensates for, etc.) the friction between the separator seal 160 and the sidewall 14, thereby allowing the shuttle to move more freely in response to pressure and/or temperature variations (e.g., the thermostat-shuttle assembly 40 provides finer control).

Briefly referring to the embodiment shown in FIG. 16, when the shuttle is in a third position (e.g., a position between the first position and the second position, between the full cold position and the full hot position, in a neutral position, etc.), the ribs 150 on the cold side 102 of the shuttle 100 span the gap 80, and the ribs 150 on the hot side 104 of the shuttle 100 span the gap 82. Accordingly, the shuttle 100 is sprung on both the cold side 102 and the hot side 104. Because the shuttle 100 is sprung and not free-floating, the shuttle 100 is inhibited from resonating (e.g., dampened), thereby reducing or eliminating the aforementioned noise. According to an exemplary embodiment, the total height of the shuttle 100 (e.g., axial distance from a peak 154 on the cold side 102 of the shuttle 100 to a peak 154 on the hot side 104 of the shuttle 100) is greater than the distance between the cold seat 64 and the hot seat 54. Further referring to FIGS. 9-11, the ribs 150 are shown to extend axially beyond the hub 110. As shown, the peaks 154 are proud of the hub 110. According to other embodiments, the peaks 154 may be below the rim 126 of the hub 110.

During the overmolding process, the shuttle 110 may be held (e.g., clamped, grasped, etc.) by rims 126 of the shuttle 110, thereby provide a seal to prevent the overmolded material from entering the cold chamber 124. Accordingly, in a finished product, the rims 126 may be deformed or crushed into a different shape than that shown in the figures. For example, the rims 126 may be crushed to an axial height substantially flush with the flat regions 152 of the overmolded portion 130. According to another embodiment, the overmolded portion 130 may extend over the rim 126 of the hub 110 and along the sidewall 116.

The number of ribs 150 on one of the sides of the shuttle 100 is greater than the number of ribs 150 on the other side of the shuttle 100. For example, according to the exemplary embodiment shown, the number of ribs 150 on the cold side 102 is greater than the number of ribs 150 on the hot side 104. The greater number of ribs 150 generally provides a greater spring force and, thus, is preferably located on the side of the shuttle 100 opposite the return spring 44. Further, a greater number of ribs 150 equates to a lesser load per rib 150 for a given force on shuttle 100. Accordingly, having a greater number of ribs 150 on the cold side 102 distributes the load from the return spring 44, thereby reducing compression set in the ribs 150. According to other embodiments, the number of ribs 150 on each side of the shuttle 100 is the same, but the ribs 150 on the side opposite the return spring 44 are formed to have a shape, or formed of a material, having a greater resiliency (e.g., spring constant, spring coefficient, etc.). By balancing the force of the return spring 44, the system may be more responsive to variations in water pressure and/or temperature and less affected by low Bernoulli principle low pressure zones.

Referring to FIG. 4, as water flows through the cold and hot inlet ports 22, 24 and into the gaps 80, 82, the water flows over the eased edges 138, 139. In an embodiment in which the joining of the sidewall portion 136 and the cold end portion 132 were not eased (e.g., the sidewall portion 136 and the cold end portion 132 joined at a substantially right angle), the excess material may vibrate or resonate in response to the aforementioned fluctuating low pressure zones. This vibration may be exacerbated by the eddies, vortices, and drag resulting when the water flow breaks over the non-eased edge. The vibration of the excess material may cause or contribute to a noise that may be audible to a user. Having eased edges 138, 139 eliminates excess material that may vibrate (e.g., like a reed) and reduces eddies, vortices, and drag as the water flows from the inlet port into the gap, thereby reducing sources of vibration and resonance, and in turn, unwanted noise. Having eased edges 138, 139 reduces eddies, vortices, and drag as the water flows from the inlet port into the gap, thereby making the valve more responsive to pressure and/or temperature variation.

The overmolded portion 130 is further shown to include a separator seal 160 extending radially outward from the sidewall portion 136 and the hub 110. As shown, the separator seal 160 extends circumferentially around the hub 110. In conventional shuttles for thermostatic valves, the hub includes an annular groove with an o-ring seated therein for sealing against the cartridge sidewall 14 (see e.g., FIG. 12). To compensate for the tolerance stack between three components (e.g., the hub, the o-ring, and the cartridge sidewall) having four tolerances (e.g., the hub outside diameter, the o-ring inside diameter, the o-ring thickness, and the cartridge sidewall inside diameter), the o-ring diameter is often greater than necessary relative to the inner diameter of the cartridge sidewall, resulting in more variable and relatively higher friction between the o-ring and the sidewall 14. Overmolding the separator seal 160 onto the hub 110 (e.g., forming the separator seal 160 from the overmolded portion 130) allows the outer diameter of the separator seal to be formed to a single, relatively tight tolerance, thereby reducing the frictional loads, and providing more consistent and predictable frictional loads, between the shuttle 100 and the inner surface 26 of the sidewall 14. The reduced frictional forces allow the thermostatic valve to be more responsive to pressure and/or temperature variation in the water flows. The profile of the separator seal may have any suitable shape (e.g., triangular, rectangular, square, quad seal, etc.) According to the embodiment shown, the separator seal 160 has a domed or circle-segment shape. As shown the separator seal is axially symmetric, but may be asymmetric in other embodiments. According to various embodiments, a plurality of separator seals, which may or may not have the same profile shape, may be spaced axially apart along the sidewall portion 136.

The pressure in the low pressure zone may also be low enough to dislodge a seal that is pressed or trapped into a groove in the shuttle, hot seat, or cold seat. By overmolding the sealing surface onto the shuttle, the hot seat, and/or the cold seat, the sealing surface is much less likely to be dislodged from the hub 110, thus hindering performance of the valve. According to the exemplary embodiment shown, the overmolded portion 130 extends to both sides 112, 114 of the hub 110, which provides greater resistance to dislodging. According to the exemplary embodiment shown, the overmolded portion 130 includes the separator seal 160, which is frictionally engaged with the sidewall 14, thereby providing greater resistance to dislodging.

Figure 12:
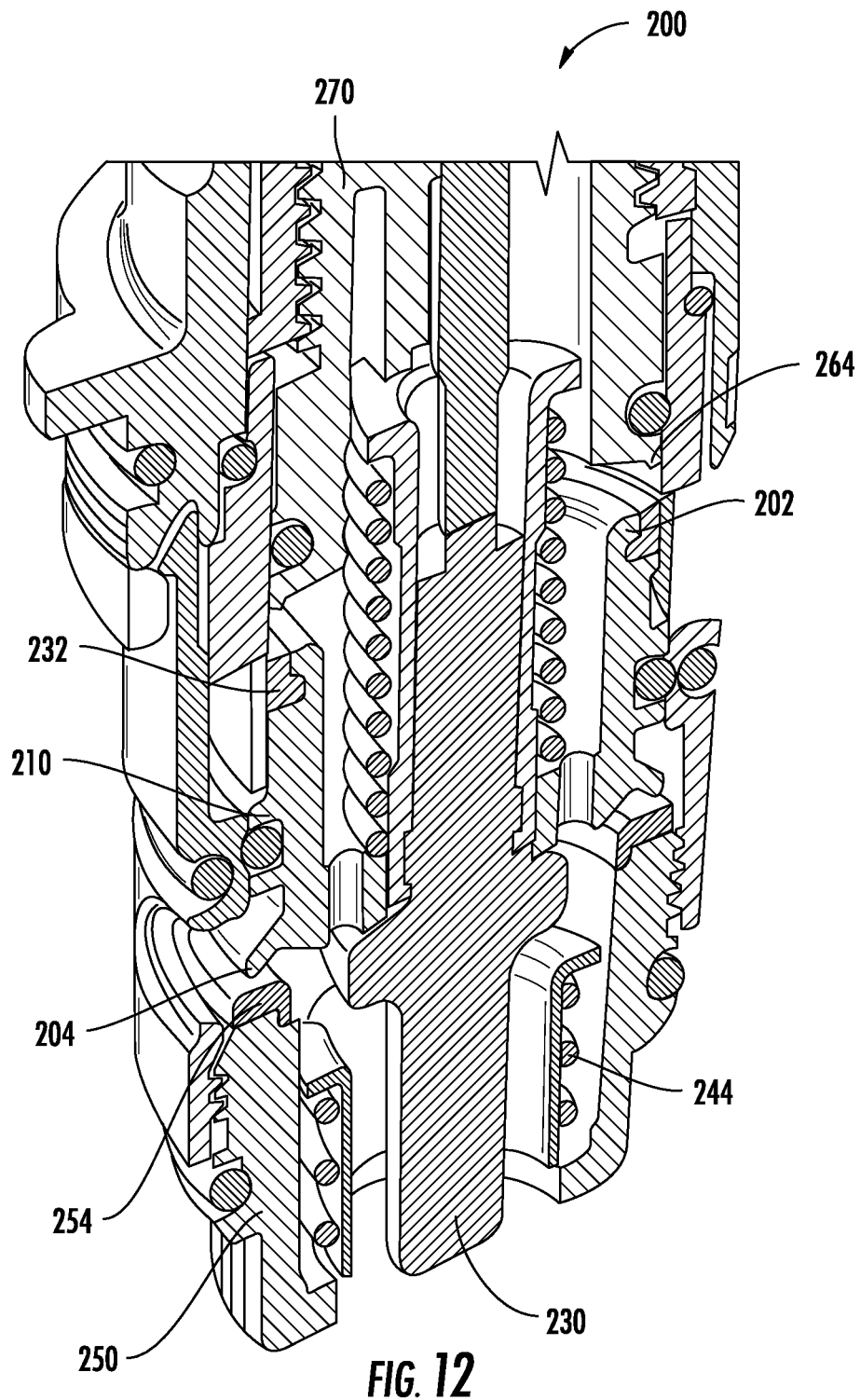
FIG. 12 is a top perspective section view of a thermostatic valve cartridge, shown according to another exemplary embodiment.

Referring to FIG. 12, a thermostatic valve cartridge 200 and components thereof are shown according to an exemplary embodiment. The cartridge 200 includes a thermostat 230 and a rubber hot seat 254 overmolded onto an end plug 250. The cartridge 200 further includes a shuttle 210 having a bottom end 204 configured to seal against the hot seat 254. The shuttle 210 further includes a sealing ring 232 trapped proximate a top end 202. According to another embodiment, the sealing ring 232 may be trapped proximate the bottom end 204 instead or in addition to the sealing ring 232 at the top end 202. The sealing ring 232 is configured to seal against a relatively hard cold seat 264 formed as part of the temperature follower 270. In another embodiment, the orientation of the hot and cold elements may be reversed such that the cartridge includes an overmolded cold seat, a shuttle that has a relatively hard top end and a seal trapped proximate the bottom end, and a relatively hard hot seat.

Figure 13:
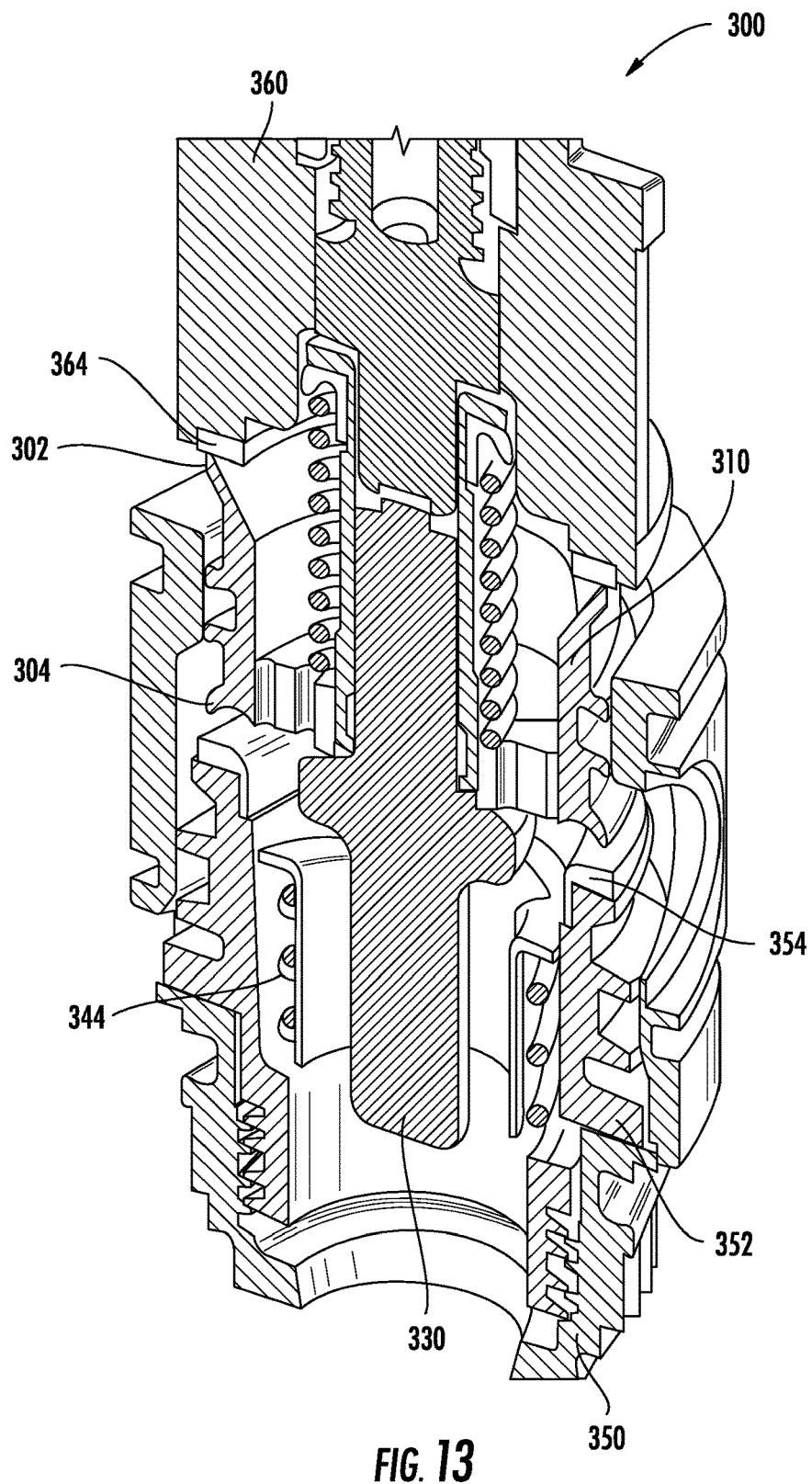
FIG. 13 is a top perspective section view of components of a thermostatic valve cartridge, shown according to another exemplary embodiment.

Referring to FIG. 13, a portion of the components of a thermostatic valve cartridge 300 are shown according to an exemplary embodiment. Cartridge 300 includes a thermostat 330 and a rubber hot seat 354 overmolded onto a hot seat body 352. As shown, the hot seat body 352 is a separate component coupled to the end plug 350. The cartridge 300 further includes a cold seat 364 overmolded on a cold seat body 360 (e.g., temperature follower, flow controller, etc.). Because the hot seat 354 and the cold seat 364 are overmolded of a relatively soft material, the shuttle 310 may be a single body having a relatively hard top end 302 configured to seal against the cold seat 364 and a relatively hard bottom end 304 configured to seal against the hot seat 354. According to another embodiment, the end plug 350 may be an actuator configured to move the hot seat body 352. According to other embodiments, the references to hot and cold with respect to valve cartridge 300 may be reversed, which may be facilitated if the end plug 350 is an actuator.

Figure 14:
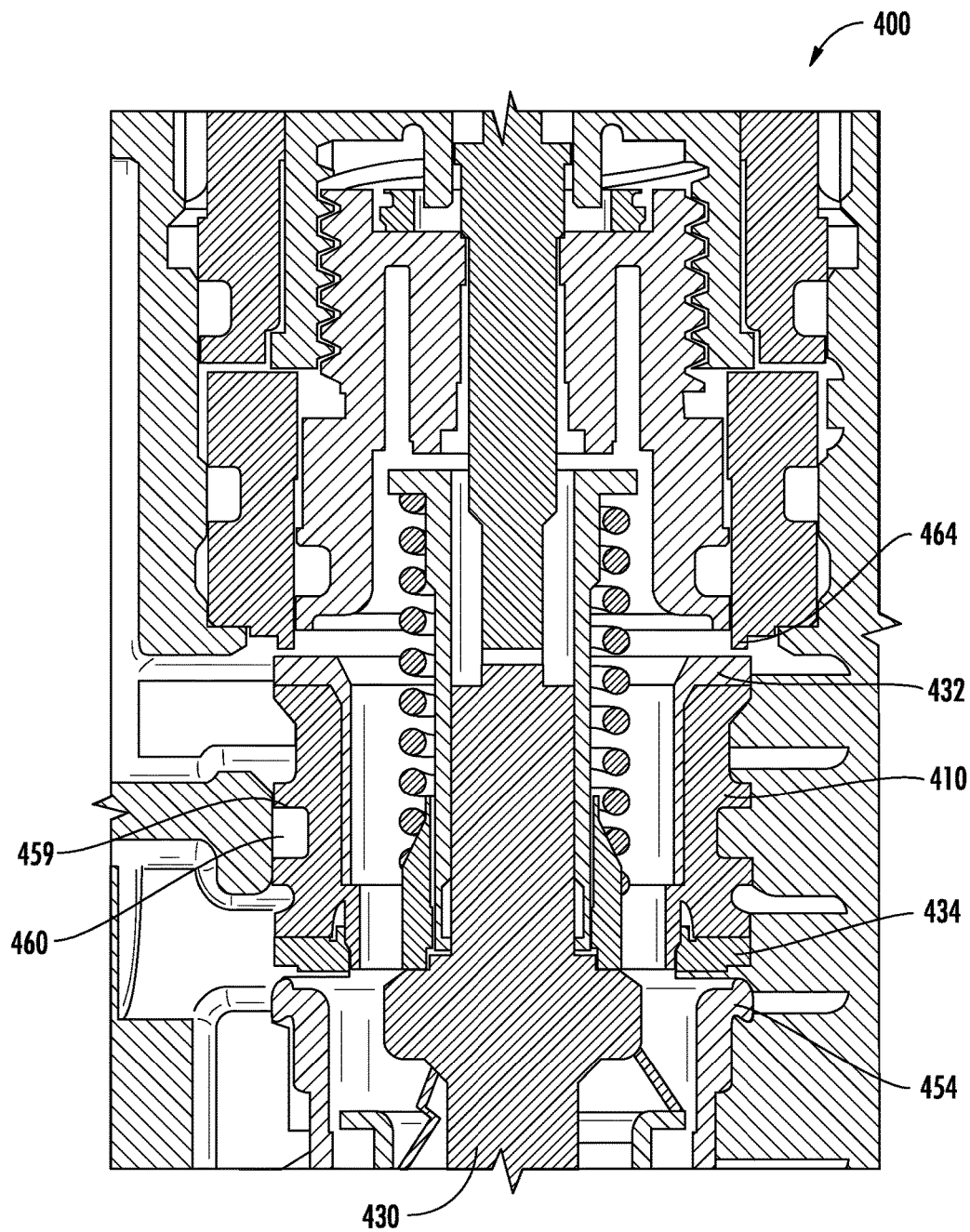
FIG. 14 is a front elevation section view of a thermostatic valve cartridge, shown according to another exemplary embodiment.

Referring to FIG. 14, a thermostatic cartridge 400 and components thereof are shown according to an exemplary embodiment. Cartridge 400 includes a thermostat 430, a relatively hard hot seat 454, and a relatively hard cold seat 464. The cartridge 400 includes a shuttle 410. A top sealing surface 432, configured to seal against the cold seat 464, and a bottom sealing surface 434, configured to seal against the hot seat 454, are overmolded onto the shuttle 410. As shown, the shuttle 410 defines an annular groove 459 that receives an annular seal 460 (e.g., o-ring, etc.), configured to seal against an inner surface of a sidewall of the cartridge 400.

Figure 15:
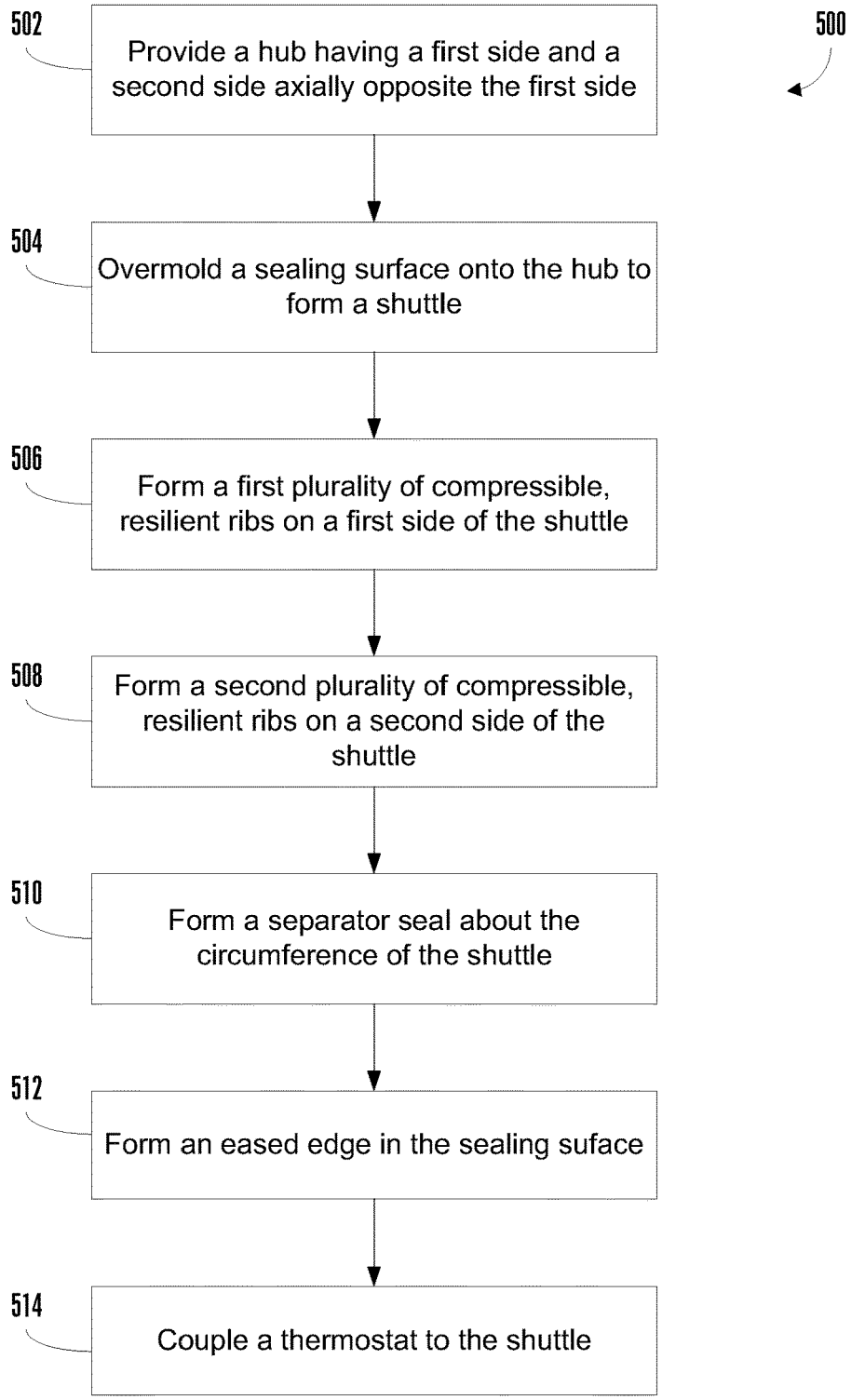
FIG. 15 illustrates a flowchart of a process for manufacturing a valve cartridge, shown according to an exemplary embodiment.

Referring to FIG. 15, a flowchart of a process 500 for manufacturing a valve cartridge is shown according to an exemplary embodiment. The process 500 is shown to include the steps of providing a hub having a first side and a second side axially opposite the first side (step 502) and overmolding a sealing portion onto the hub to form a shuttle (step 504). The process 500 is shown to further include the step of coupling a thermostat to the shuttle (step 514). According to one exemplary embodiment, the overmolding step (504) may include forming a first plurality of compressible, resilient ribs on a first side of the shuttle (step 506). According to one exemplary embodiment, the overmolding step (504) may include forming a second plurality of compressible, resilient ribs on a second side of the shuttle (step 508). According to one exemplary embodiment, the overmolding step (504) may include forming a separator seal about the circumference of the shuttle (step 510). According to one exemplary embodiment, the overmolding step (504) may include forming an eased edge in the sealing surface (step 512).

The construction and arrangement of the elements of the thermostatic valve, and components thereof, as shown in the exemplary embodiments are illustrative only. Although only a few embodiments of the present disclosure have been described in detail, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements. The elements and assemblies may be constructed from any of a wide variety of materials that provide sufficient strength or durability, in any of a wide variety of colors, textures, and combinations. Additionally, in the subject description, the word "exemplary" is used to mean serving as an example, instance, or illustration. Any embodiment or design described herein as "exemplary" is not necessarily to be construed as preferred or advantageous over other embodiments or designs. Rather, use of the word "exemplary" is intended to present concepts in a concrete manner. Accordingly, all such modifications are intended to be included within the scope of the present disclosure. Other substitutions, modifications, changes, and omissions may be made in the design, operating conditions, and arrangement of the preferred and other exemplary embodiments without departing from the scope of the appended claims.

For purposes of this disclosure, references to "front," "back," "rear," "upward," "downward," "inner," "outer," "right," and "left" in this description are merely used to identify the various elements as they are oriented in the FIGURES. These terms are not meant to limit the element which they describe, as the various elements may be oriented differently in various applications. Further, the term "coupled" means the joining of two members directly or indirectly to one another. Such joining may be stationary in nature or moveable in nature and/or such joining may allow for the flow of fluids, electricity, electrical signals, or other types of signals or communication between the two members. Such joining may be achieved with the two members or the two members and any additional intermediate members being integrally formed as a single unitary body with one another or with the two members or the two members and any additional intermediate members being attached to one another. Such joining may be permanent in nature or alternatively may be removable or releasable in nature.

The order or sequence of any process or method steps may be varied or re-sequenced according to alternative embodiments. Any means-plus-function clause is intended to cover the structures described herein as performing the recited function and not only structural equivalents but also equivalent structures. Other substitutions, modifications, changes and omissions may be made in the design, operating configuration, and arrangement of the preferred and other exemplary embodiments without departing from the scope of the appended claims.

What is claimed is:

1. A thermostatic valve, comprising:
   a body having a first seat and a second seat spaced apart in an axial direction from the first seat, wherein the body includes a sidewall defining an axially extending cavity; and
   a shuttle that is located between the first seat and the second seat, extends between a first side and a second side axially opposite the first side, and is movable in the axial direction relative to the body between a first position in which the first side of the shuttle seals against the first seat and a second position in which the second side of the shuttle seals against the second seat, wherein the shuttle comprises:
   a hub comprising a first portion; and
   an overmolded second portion disposed on the first portion of the hub for sealing the first seat in the first position and the second seat in the second position;

wherein the second portion extends radially from an outside of the hub and seals between the shuttle and the sidewall of the body;

wherein the first portion comprises a first material that is different than a second material of the second portion; and wherein the overmolded second portion forms a plurality of ribs that extend in the axial direction from at least one of the first side or the second side.

2. The thermostatic valve of claim 1, wherein the plurality of ribs form a substantially sinusoidal shape in the axial direction around a circumference of the first side of the shuttle.

3. The thermostatic valve of claim 1, wherein the plurality of ribs are aligned around a circumference of the first side of the shuttle and the plurality of ribs are spaced circumferentially apart with substantially flat regions of the overmolded portion located around the circumference and between the ribs.

4. The thermostatic valve of claim 1, wherein when the shuttle is in the first position, the plurality of ribs are compressed in the axial direction to form a substantially flat sealing surface.

5. The thermostatic valve of claim 4, wherein the plurality of ribs are resilient such that when the ribs are in the first position, the ribs provide a force pushing the shuttle towards the second position.

6. The thermostatic valve of claim 1, wherein the plurality of ribs is a first plurality of ribs disposed on the first side of the shuttle, and a second plurality of ribs are disposed on the second side of the shuttle opposite the plurality of ribs on the first side.

7. The thermostatic valve of claim 6, wherein the shuttle comprises a third position between the first position and the second position, and when the shuttle is in the third position:
   a first gap is formed between the first side of the shuttle and the first seat, the first plurality of ribs spanning the first gap; and
   a second gap is formed between the second side of the shuttle and the second seat, the second plurality of ribs spanning the second gap.

8. The thermostatic valve of claim 6, wherein a number of ribs in the first plurality of ribs is greater than a number of ribs in the second plurality of ribs.

9. The thermostatic valve of claim 8, further comprising a spring configured to bias the shuttle towards the first position.

10. A shuttle for a thermostatic valve having a thermostat, a first seat, and a second seat, the shuttle comprising:
   a hub having a first side and a second side axially opposite the first side and defining a plurality of passages extending axially through the hub; and
   a sealing portion overmolded onto the first side, the second side, and an outer sidewall of the hub, the outer sidewall extending between the first and second sides;
   wherein the sealing portion includes a plurality of ribs that extends in the axial direction from at least one of the first and second sides of the hub, such that the plurality of ribs are configured to selectively engage one of the first seat or the second seat in a first position of the shuttle;

wherein the hub is formed of a first material, and the sealing portion is formed of a second material different than the first material; and wherein the second material is more resilient than the first material.

11. The thermostatic valve of claim 1, wherein the second material is more resilient than the first material.

12. The shuttle of claim 10, wherein the sealing portion comprises a separator seal extending radially outward and circumferentially around the hub.

13. The shuttle of claim 10, wherein the sealing portion comprises an end portion disposed on the first side of the hub and a sidewall portion extending at least partially between the first side and the second side of the hub, wherein the end portion and the sidewall portion are joined by an eased edge.

14. The shuttle of claim 10, wherein the plurality of ribs are configured to compress against at least one of the first seat or the second seat.

15. The shuttle of claim 10, wherein the plurality of ribs are a first plurality of ribs disposed on the first side of the hub and configured to selectively engage the first seat in the first position of the shuttle, and a second plurality of ribs are disposed on the second side of the shuttle and configured to selectively engage the second seat in a second position of the shuttle, and wherein a number of ribs in the first plurality of ribs is greater than a number of ribs in the second plurality of ribs.

16. A method for manufacturing a thermostatic valve having a first seat and a second seat, comprising:
   providing a hub having a sidewall extending in an axial direction between a first side and a second side axially opposite the first side; and
   overmolding a sealing portion onto at least a portion of the sidewall, the first side, and the second side of the hub to form a shuttle, wherein the sealing portion comprises:
      a first end portion that is overmolded onto the first side of the hub and is configured to selectively engage the first seat;
      a second end portion that is overmolded onto the second side of the hub and is configured to selectively engage the second seat; and
      a sidewall portion that is overmolded onto the sidewall of the hub and interconnects the first end portion and the second end portion;
   wherein the hub is formed of a first material, and the sealing portion is formed of a second material different than the first material, and
   wherein the overmolding step comprises forming a first plurality of compressible, resilient ribs on a first side of the shuttle with each rib extending in the axial direction from the first side.

17. The method of claim 16, wherein the overmolding step comprises forming a separator seal about a circumference of the shuttle between the first side and the second side, the separator seal extending radially outward from the portion of the sealing portion overmolded onto the sidewall of the hub.

18. The method of claim 16, further comprising coupling a thermostat to the shuttle.

* * * * *

UNITED STATES PATENT AND TRADEMARK OFFICE
CERTIFICATE OF CORRECTION

| | |
|---|---|
| PATENT NO. | : 10,544,873 B2 |
| APPLICATION NO. | : 13/830752 |
| DATED | : January 28, 2020 |
| INVENTOR(S) | : Sansum et al. |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 807 days.

Signed and Sealed this
Sixth Day of December, 2022

Katherine Kelly Vidal
*Director of the United States Patent and Trademark Office*